United States Patent
Lee et al.

(10) Patent No.: US 11,522,583 B2
(45) Date of Patent: *Dec. 6, 2022

(54) WIRELESS COMMUNICATION METHOD AND APPARATUS FOR WIRELESS LOCAL AREA NETWORK SYSTEM

(71) Applicant: ELECTRONICS AND TELECOMMUNICATIONS RESEARCH INSTITUTE, Daejeon (KR)

(72) Inventors: Yu Ro Lee, Daejeon (KR); Jae Woo Park, Daejeon (KR); Jae Seung Lee, Daejeon (KR); Jee Yon Choi, Daejeon (KR); Il Gyu Kim, Chungcheongbuk-do (KR); Seung Chan Bang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 86 days.

This patent is subject to a terminal disclaimer.

(21) Appl. No.: 17/154,779

(22) Filed: Jan. 21, 2021

(65) Prior Publication Data
US 2021/0143873 A1    May 13, 2021

Related U.S. Application Data

(63) Continuation of application No. 16/440,641, filed on Jun. 13, 2019, now Pat. No. 10,931,336, which is a
(Continued)

(30) Foreign Application Priority Data

Sep. 30, 2014 (KR) .......... 10-2014-0130829
Sep. 25, 2015 (KR) .......... 10-2015-0136305

(51) Int. Cl.
*H04B 7/06* (2006.01)
*H04L 5/00* (2006.01)
(Continued)

(52) U.S. Cl.
CPC ........... *H04B 7/0452* (2013.01); *H04B 7/068* (2013.01); *H04B 7/0697* (2013.01);
(Continued)

(58) Field of Classification Search
CPC .... H04B 7/0452; H04B 7/068; H04B 7/0697; H04L 5/0028; H04L 5/0092; H04L 5/0023; H04L 5/0064
See application file for complete search history.

(56) References Cited

U.S. PATENT DOCUMENTS 10,931,336 B2 * 2/2021 Lee .................. H04L 5/0028
2010/0002806 A1 1/2010 Lee et al.
(Continued)

FOREIGN PATENT DOCUMENTS

KR  1020130071396 A  6/2013
KR  1020140110849 A  9/2014

OTHER PUBLICATIONS

"IEEE Standard for Information technology—Telecommunications and information exchange between systems—Local and metropolitan area networks—Specific requirements", 2013, IEEE Computer Society, IEEE 802.11n Standard.
(Continued)

*Primary Examiner* — Diane L Lo
*Assistant Examiner* — Abusayeed M Haque

(57) ABSTRACT

A wireless communication method and apparatus in a wireless local area network (WLAN) system are disclosed. A wireless communication method according to one embodiment may include generating a high-efficiency Wi-Fi (HEW) frame including at least one of an HEW-SIG-A field and an
(Continued)

HEW-SIG-B field which include channel information for communications according to an Orthogonal Frequency-Division Multiple Access (OFDMA) mode, and transmitting the generated HEW frame to a reception apparatus.

10 Claims, 39 Drawing Sheets

Related U.S. Application Data continuation of application No. 14/868,908, filed on Sep. 29, 2015, now Pat. No. 10,367,549.

(51) Int. Cl.
*H04W 72/04* (2009.01)
*H04B 7/0452* (2017.01)
*H04W 84/12* (2009.01)

(52) U.S. Cl.
CPC .......... *H04L 5/0028* (2013.01); *H04L 5/0064* (2013.01); *H04L 5/0092* (2013.01); *H04W 72/0453* (2013.01); *H04L 5/0023* (2013.01); *H04W 84/12* (2013.01)

(56) References Cited

U.S. PATENT DOCUMENTS

| | | | |
|---|---|---|---|
| 2012/0020261 A1* | 1/2012 | Van Zelst | H04L 69/22 370/310 |
| 2012/0263158 A1 | 10/2012 | Lee et al. | |
| 2013/0003679 A1 | 1/2013 | Seok et al. | |
| 2013/0121243 A1* | 5/2013 | Vermani | H04L 69/18 370/328 |
| 2013/0279381 A1* | 10/2013 | Sampath | H04W 56/00 370/336 |
| 2015/0103713 A1* | 4/2015 | Lee | H04W 74/0816 370/311 |
| 2016/0234697 A1* | 8/2016 | Azizi | H04W 72/044 |
| 2016/0345277 A1* | 11/2016 | Segev | H04W 56/001 |

OTHER PUBLICATIONS

Yongho Seok et al., "HEW PPDU Format for Supporting MIMO-OFDMA", Sep. 14, 2014, pp. 1-16, doc.: IEEE 802.11-14/1210r1.

* cited by examiner

FIG. 19

| OFDMA name : | BW[0] | MCS[0] | Partial AID[0] | Reserved |
|---|---|---|---|---|
| | B0 B1 B2 | B5 B6 | B14 B15 | B19 |
| Bits : | 2 | 4 | 9 | 5 |

| OFDMA name : | BW[1] | MCS[1] | Partial AID[1] | Reserved |
|---|---|---|---|---|
| | B20 B21 B22 | B25 B26 | B34 B35 | B39 |
| Bits : | 2 | 4 | 9 | 5 |

| OFDMA name : | BW[2] | MCS[2] | Partial AID[2] | Reserved |
|---|---|---|---|---|
| | B40 B41 B42 | B45 B46 | B54 B55 | B59 |
| Bits : | 2 | 4 | 9 | 5 |

| OFDMA name : | BW[3] | MCS[3] | Partial AID[3] | Reserved | CRC or reserved | Tail |
|---|---|---|---|---|---|---|
| | B60 B61 B62 | B65 B66 | B74 B75 | B102 B103 | B110 B111 | B116 |
| Bits : | 2 | 4 | 9 | 28 | 8 | 6 |

WIRELESS COMMUNICATION METHOD AND APPARATUS FOR WIRELESS LOCAL AREA NETWORK SYSTEM

CROSS-REFERENCE TO RELATED APPLICATIONS

This application is a continuation of U.S. application Ser. No. 16/440,641, filed Jun. 13, 2019, which is a continuation of U.S. application Ser. No. 14/868,908, filed Sep. 29, 2015, which claims the benefit of Korean Patent Application Nos. 10-2014-0130829 and 10-2015-0136305, filed Sep. 30, 2014 and Sep. 25, 2015, which are hereby incorporated by reference herein in their entirety.

TECHNICAL FIELD

Exemplary embodiments relate to a wireless communication technology for a wireless local area network system.

BACKGROUND ART

In a wireless local area network (WLAN) system, communications between an access point (AP) and a station are performed. The AP provides stations with communication services to in a service range.

A basic configuration block of a WLAN system defined in IEEE 802.11 is a basic service set (BSS). A BSS may include an independent BSS in which user terminals in the BSS perform direct communications with each other, an infrastructure BSS in which an AP is involved in communications between a user terminal and a user terminal inside or outside the BSS, and an extended service set which connects different BSSs to extend a service area.

DISCLOSURE OF INVENTION

Technical Solutions

A wireless communication method according to one embodiment may include generating a high-efficiency Wi-Fi (HEW) frame including at least one of an HEW-SIG-A field and an HEW-SIG-B field which include channel information for communications according to an Orthogonal Frequency-Division Multiple Access (OFDMA) mode; and transmitting the generated HEW frame to at least one reception apparatus.

In the wireless communication method according to the embodiment, the HEW-SIG-A field may include at least one of bit information indicating an OFDMA mode, bit information indicating a number of space-time streams (NSTS) of channels transmitted in the OFDMA mode, and bit information indicating a coding mode of channels transmitted in the OFDMA mode.

In the wireless communication method according to the embodiment, the HEW-SIG-A field may include at least one of bit information indicating an OFDMA mode, bit information indicating a multi-user multiple-input multiple-output (MU-MIMO) mode, and bit information indicating a channel to be demodulated by each reception apparatus.

In the wireless communication method according to the embodiment, the HEW-SIG-B field may include at least one of bit information indicating a bandwidth used by each channel in the OFDMA mode, bit information indicating a modulation and coding mode used by each channel in the OFDMA mode, bit information indicating a partial allocation identifier (AID) used by each channel in the OFDMA mode, bit information including subchannel allocation information in the OFDMA mode, and bit information indicating an NSTS of channels transmitted in the OFDMA mode.

A wireless communication method according to another embodiment may include receiving, from a transmission apparatus, an HEW frame including at least one of an HEW-SIG-A field and an HEW-SIG-B field which include channel information for communication according to an OFDMA mode; and determining a channel to be used for communications using the channel information included in at least one of the HEW-SIG-A field and the HEW-SIG-B field.

In the wireless communication method according to the other embodiment, the determining of the channel may determine, based on the channel information included in the HEW-SIG-A field, a channel through which the HEW-SIG-B field is transmitted.

A wireless communication apparatus according to one embodiment may include a processor to generate an HEW frame including at least one of an HEW-SIG-A field and an HEW-SIG-B field which include channel information for communications according to an OFDMA mode; and a transmitter to transmit the generated HEW frame to at least one reception apparatus.

A wireless communication apparatus according to another embodiment may include a receiver to receive an HEW frame including at least one of an HEW-SIG-A field and an HEW-SIG-B field which include channel information for communications according to an OFDMA mode from a transmission apparatus; and a processor to determine a channel to be used for communications using the channel information included in at least one of the HEW-SIG-A field and the HEW-SIG-B field.

BRIEF DESCRIPTION OF DRAWINGS

FIG. 19 is a diagram illustrating an example of an HEW-SIG-B structure in a case where a channel is allocated adjacent subchannels in an 80-MHz bandwidth according to the first embodiment.

DETAILED DESCRIPTION OF EXEMPLARY EMBODIMENTS

Figure 1:
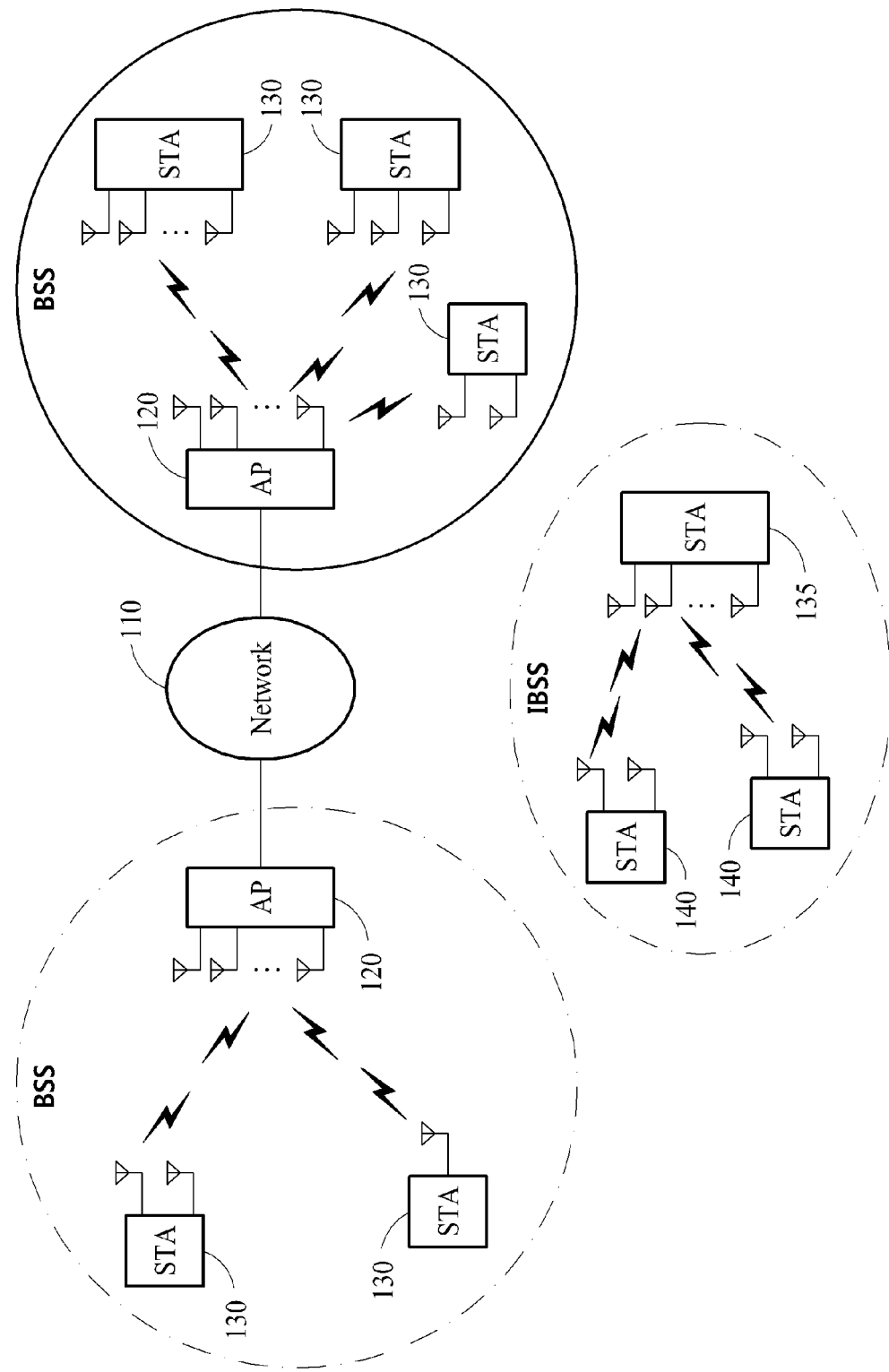
FIG. 1 is a diagram illustrating an example of a wireless communication network according to an embodiment.

The following specific structural and functional descriptions are provided only to illustrate embodiments and are not construed as limiting the scope of claims to the descriptions made in this specification. A person skilled in the art can make various changes and modifications from these descriptions. In this specification, the term "one embodiment" or "embodiments" is provided to mean that particular features, structures or characteristics described in connection with the embodiment or embodiments are included in at least one embodiment and is not understood to refer to the same embodiment or embodiments.

The terms "first," "second", and the like may be used to distinguish different elements but are not construed as limiting elements. Further, the terminology used herein is for the purpose of describing particular embodiments only and is not intended to limit the embodiments. As used herein, the singular forms are intended to include the plural forms as well, unless the context clearly indicates otherwise.

It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, or combinations thereof.

Hereinafter, embodiments will be described in detail with reference to the accompanying drawings. In the description with reference to the accompanying drawings, like reference numerals denote like elements, and descriptions thereof will be omitted.

FIG. 1 is a diagram illustrating an example of a wireless communication network according to an embodiment.

Referring to FIG. 1, a network 110 may be connected to a plurality of access points (APs) 120. Each of the APs 120 may communicate with a plurality of stations 130 in a basic service set (BSS). In an independent BBS (IBBS), one station 135 may simultaneously communicate with a plurality of stations 140.

Figure 2:
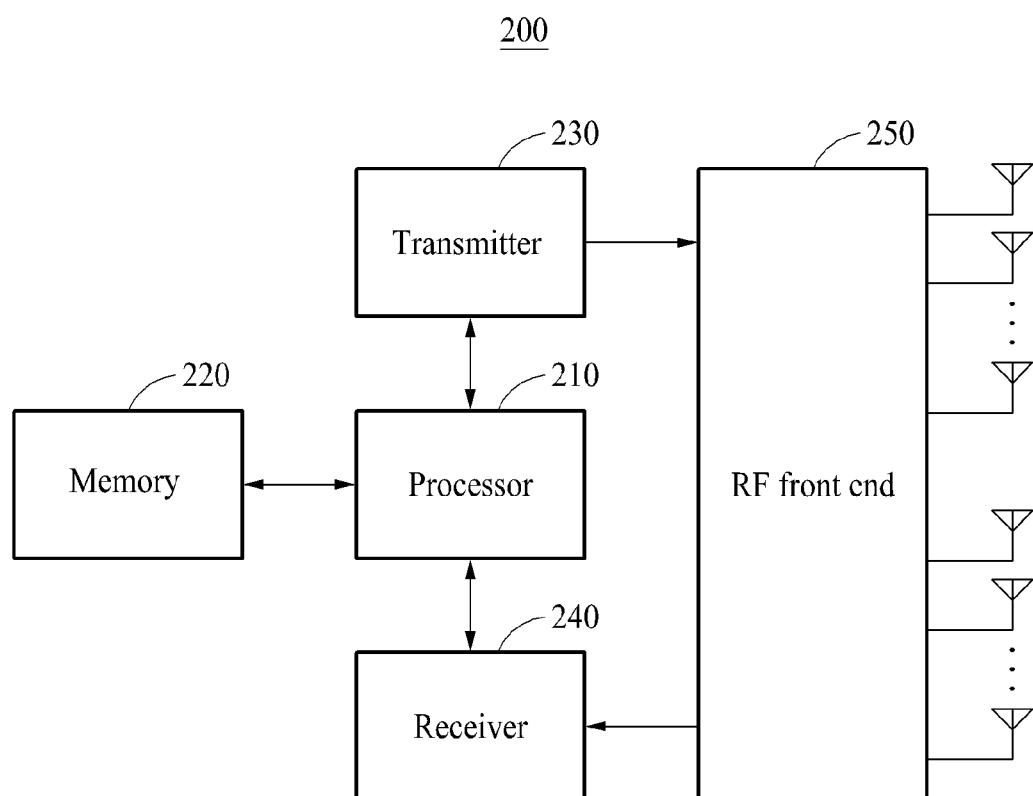
FIG. 2 is a diagram illustrating a structure of a wireless communication apparatus according to an embodiment.

FIG. 2 is a diagram illustrating a structure of a wireless communication apparatus according to an embodiment. Referring to FIG. 2, the wireless communication apparatus 200 may include a processor 210, a memory 220, a transmitter 230, a receiver 240, and a radio frequency (RF) front end 250. The wireless communication apparatus 200 may be a device capable of realizing the following embodiments, which may correspond to a transmission apparatus or reception apparatus described in this specification. According to one embodiment, the transmission apparatus may be an AP, and the reception apparatus may be a station.

The processor 210 may implement a function, a process and/or a method suggested in the present invention. The processor 210 may conduct control to perform digital transmission and reception functions supported in communication standards. These functions may include protocol layer convergence procedure (PLCP), physical medium dependent (PMD), associated layer management, and medium access control (MAC) layers and be implemented by various methods.

The processor 210 may include an application-specific integrated circuit (ASIC), another chipset, a logic circuit, a data processing apparatus, and/or a converter which mutually converts a baseband signal and a wireless signal.

The memory 220 may be configured in a combination of logic, a circuit, a code, or the like, without being limited thereto. The memory 220 may include a read-only memory (ROM), a random access memory (RAM), a flash memory, a memory card, a storage medium and/or other storage devices.

The transmitter 230 may perform a wireless signal transmitting function through coding, puncturing, interleaving, mapping, modulation, inverse fast Fourier transform (IFTT), and spatial mapping processes, without being limited thereto.

The receiver 240 may perform a wireless signal receiving function through fast Fourier transform (FFT), equalization, demapping, demodulation, deinterleaving, depuncturing, and decoding processes, without being limited thereto.

The RF front end 250 may convert a digital baseband signal received from the transmitter 230 into an analog RF signal and transmit the analog RF signal through one or more antennas.

Further, the RF front end 250 may receive an analog RF signal from the outside through antennas and convert the received analog RF signal into a digital baseband signal. The RF front end 250 may transmit the converted digital baseband signal to the receiver 240.

Figure 3A:
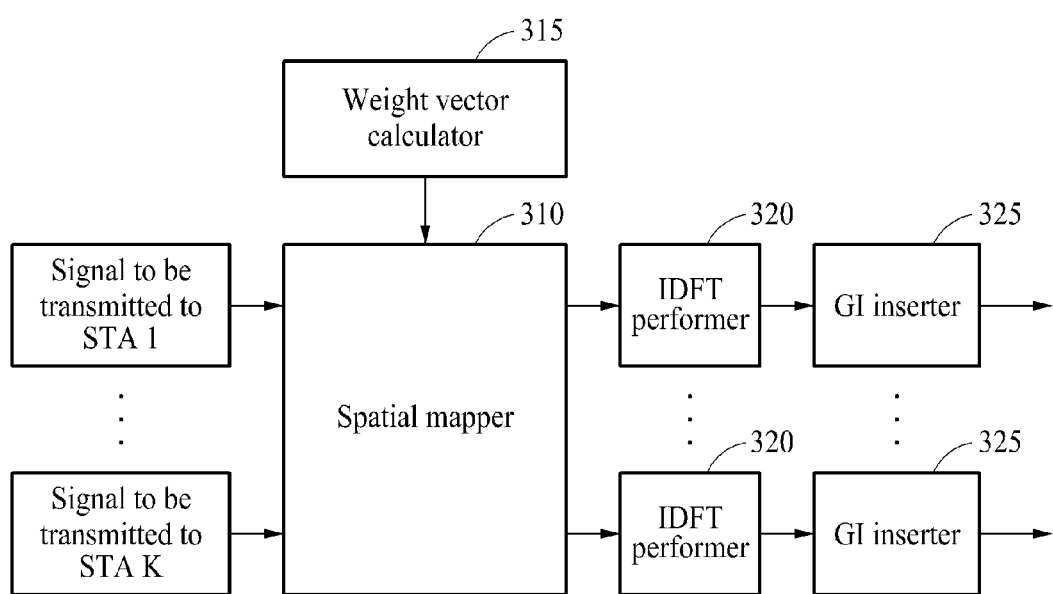
FIGS. 3A and 3B are diagrams illustrating a structure of a transmitter of a wireless communication apparatus according to an embodiment.
Figure 3B:
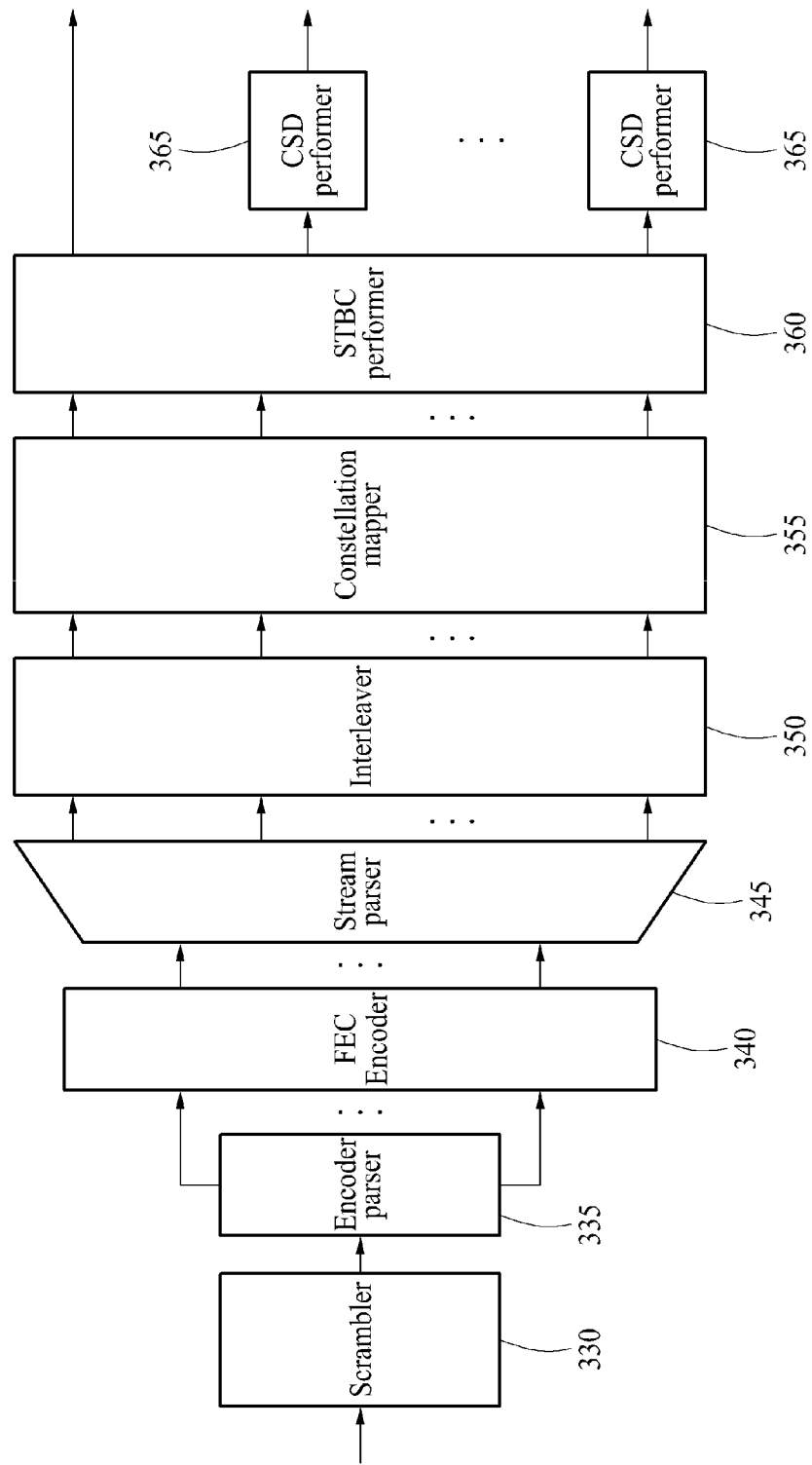

FIG. 3A and FIG. 3B are diagrams illustrating a structure of a transmitter of a wireless communication apparatus according to an embodiment. Referring to FIG. 3A, a spatial mapper 310 may receive signals to be simultaneously transmitted to a plurality of stations. A weight vector calculator 315 may calculate a weight vector (matrix) to be applied to transport streams of stations using a multiple-input multiple-output (MIMO) channel and determine stations to which signals are simultaneously transmitted.

The spatial mapper 310 may map each input signal on a weighting using information on the calculated weight matrix. An inverse discrete Fourier transformer (IDFT) performer 320 may perform IDFT on weighting-mapped input signals. A guard interval inserter 325 may insert a guard interval (GI) to an IDFT-processed signal and perform windowing to insert a window.

FIG. 3B is a diagram illustrating a process of generating a signal to be transmitted to a station. Referring to FIG. 3B, a scrambler 330 may scramble data to be transmitted by a transmitter of a station. An encoder parser 335 may separate scrambled data as many as a number of encodes. A forward error correction (FEC) encoder 340 may perform FEC encoding on the separated data as many as the number of encodes.

A stream parser 345 may separate the FEC-encoded data as many as a number of streams. An interleaver 350 may perform interleaving on the separated data as many as the number of streams. A constellation mapper 355 may map the interleaved data using binary phase-shift keying (BPSK), quadrature phase-shift keying (QPSK), 160 quadrature amplitude modulation (QAM), 128 QAM, 256 QAM, or the like.

A spatial time block code (STBC) performer 360 may perform STBC on the data transmitted from the constellation mapper 355. A cyclic shift delay (CSD) performer 365 may perform CSD on the STBC-performed data. The CSD-performed data may be transmitted to the spatial mapper 310 of FIG. 3A.

Figure 4:
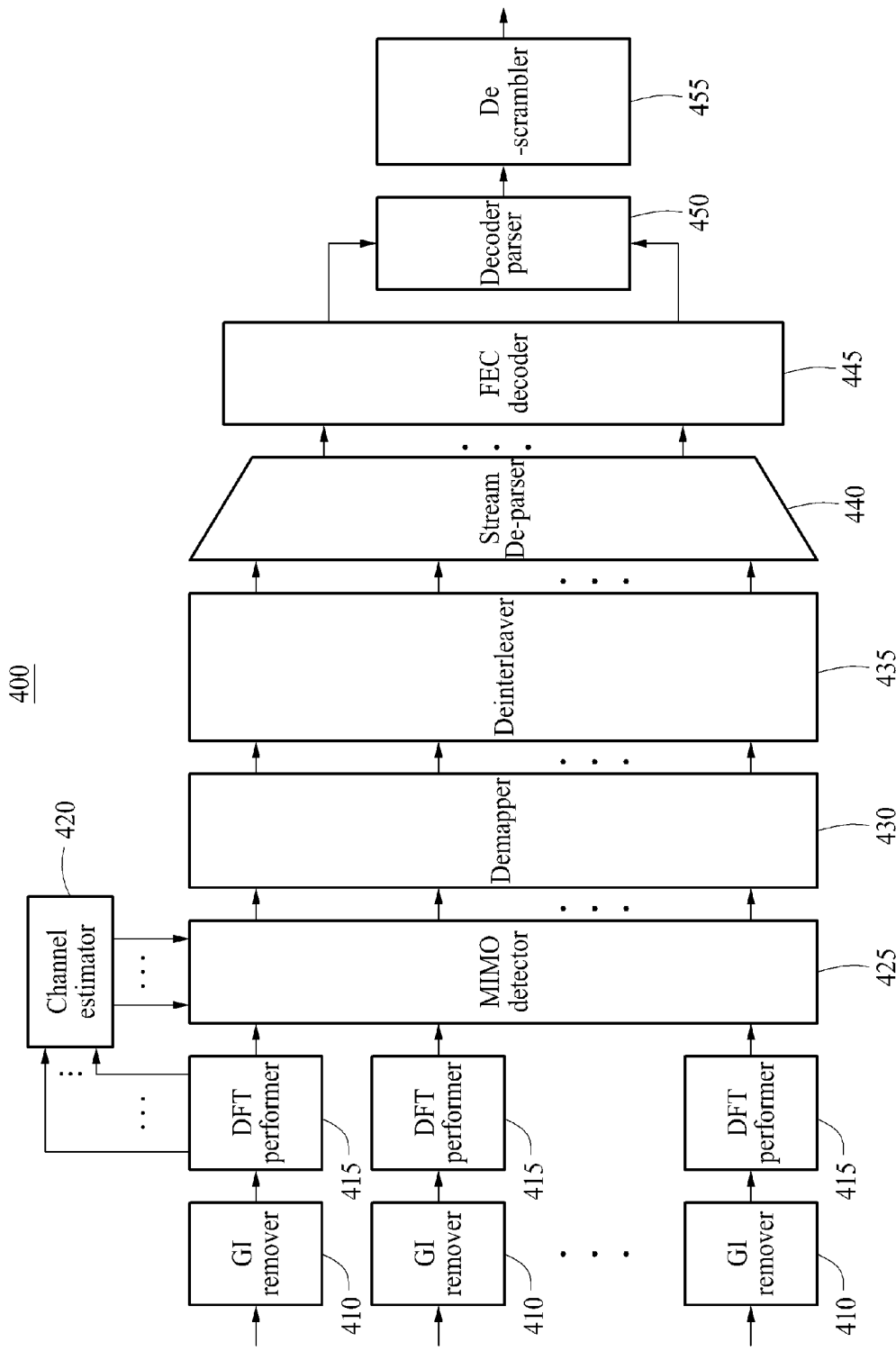
FIG. 4 is a diagram illustrating a structure of a receiver of a wireless communication apparatus according to an embodiment.

FIG. 4 is a diagram illustrating a structure of a receiver of a wireless communication apparatus according to an embodiment. Referring to FIG. 4, the receiver 400 of the wireless communication apparatus may perform analog-to-digital (AD) conversion on data passing through a wireless channel after passing through an RF communicator (not shown).

A GI remover 410 may perform carrier sensing, automatic gain control (AGC), timing synchronization, and frequency offset estimation on the converted digital data and remove a GI.

A discrete Fourier transform (DFT) performer 415 may perform DFT on the GI-removed data. A channel estimator 420 may estimate a channel based on a long training field (LTF) of the DFT-processed data. An MIMO detector 425 may demodulate the data based on a data field of the DFT-processed data and a channel estimation result by the channel estimator 420.

A demapper 430 may convert the demodulated data into a soft value needed for FEC decoding. A deinterleaver 435 may perform deinterleaving on the data converted into the soft value, and a stream de-parser 440 may separate the deinterleaved data according to a number of FEC decoders 445. An FEC decoder 445 may perform FEC decoding on the transmitted data, and a decoder parser 450 may combine pieces of FEC-decoded data. A de-scrambler 455 may descramble the transmitted data to reconstruct the data.

Figure 5:
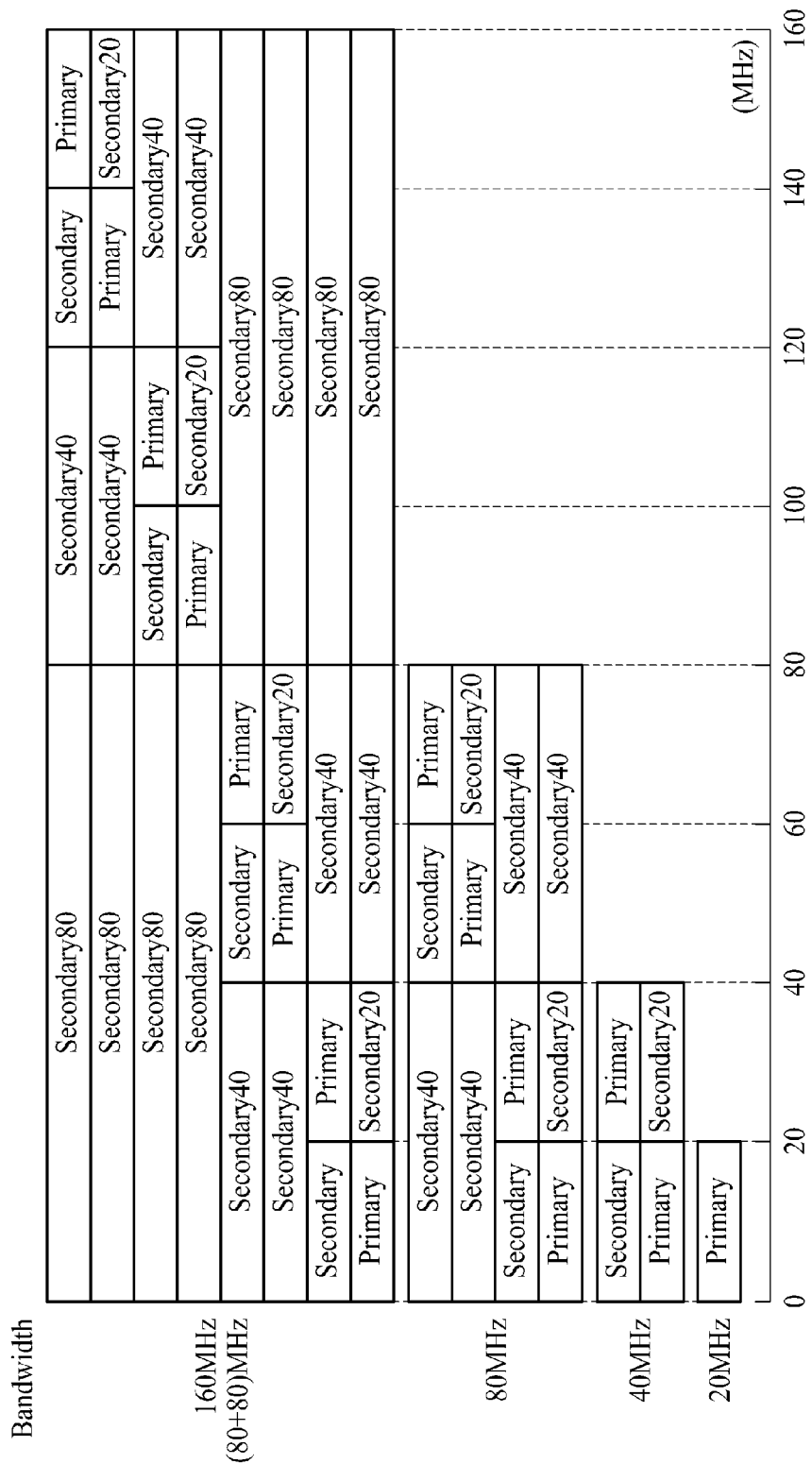
FIG. 5 is a diagram illustrating channel allocation according to a bandwidth in IEEE 802.11a/g/n/ac according to an embodiment.

FIG. 5 is a diagram illustrating channel allocation according to a bandwidth in IEEE802.11a/g/n/ac according to an embodiment. Referring to FIG. 5, IEEE802.11a/g/n/ac WLAN systems may use various bandwidths, such as 20 MHz, 40 MHz, 80 MHz and 160 MHz (80 MHz+80 MHz), and include a primary channel and secondary channels in 20-MHz channel units.

In the WLAN systems, wireless communication apparatuses verify whether the channels are in a busy state or idle state, and transmit data when the channels are idle. The wireless communication apparatuses perform transmission depending on whether the channels are in the busy state or idle state as in Table 1

TABLE 1

| Bandwidth (MHz) | Primary | Secondary20 | Secondary40 | Secondary80 | Transmission bandwidth |
|---|---|---|---|---|---|
| 20 | busy | — | — | — | 0 |
| 20 | idle | — | — | — | 20 |
| 40 | busy | don't care | — | — | 0 |
| 40 | idle | busy | — | — | 20 |
| 40 | idle | idle | — | — | 40 |
| 80 | busy | don't care | don't care | — | 0 |
| 80 | idle | busy | don't care | — | 20 |
| 80 | idle | idle | busy | — | 40 |
| 80 | idle | idle | idle | — | 80 |
| 160(80 + 80) | busy | don't care | don't care | don't care | 0 |
| 160(80 + 80) | idle | busy | don't care | don't care | 20 |
| 160(80 + 80) | idle | idle | busy | don't care | 40 |
| 160(80 + 80) | idle | idle | idle | busy | 80 |
| 160(80 + 80) | idle | idle | idle | idle | 160 |

Table 1 illustrates transmission bandwidths depending on whether the channels are in the busy state or idle state. As in Table 1, the wireless communication apparatuses may verify whether the channel are in the busy state or idle state in order of primary, secondary20, secondary40, and secondary80 and by bandwidth to determine a transmission bandwidth. As illustrated in FIG. 5, when any one of 20-MHz channels belonging to secondary40 is in the busy state in an AP or station supporting an 80-MHz bandwidth, a transmission bandwidth is 40 MHz.

Figure 6:
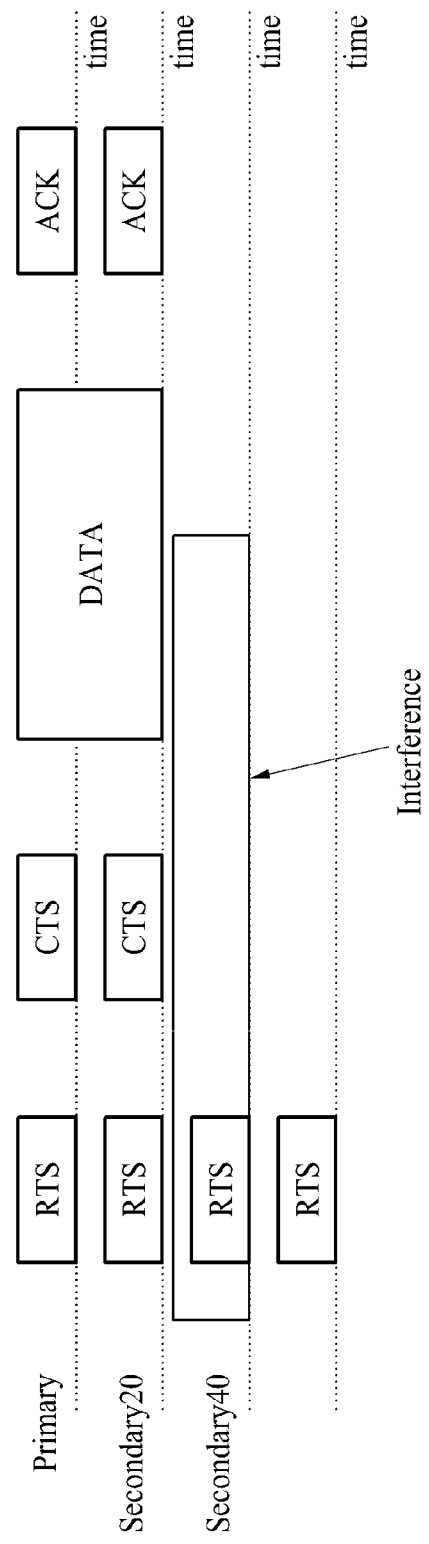
FIG. 6 is a diagram illustrating a transmission bandwidth when a channel is in a busy state by interference.

FIG. 6 is a diagram illustrating a transmission bandwidth when a channel is in the busy state by interference. In the channel allocation method illustrated in FIG. 5, when any one of channels in 20-MHz units among secondary channels becomes busy in a case of supporting a wide bandwidth, such as 80 MHz or 160 MHz, all the secondary channels may not be used. For example, when any one of channels in 20-MHz units of secondary80 becomes busy in an AP or station supporting a 160-MHz channel, 80 MHz of secondary80 is not transmitted, and thus an AP or station capable of using 140 MHz uses only 80 MHz, thereby allowing frequency utilization efficiency to deteriorate.

Figure 7:
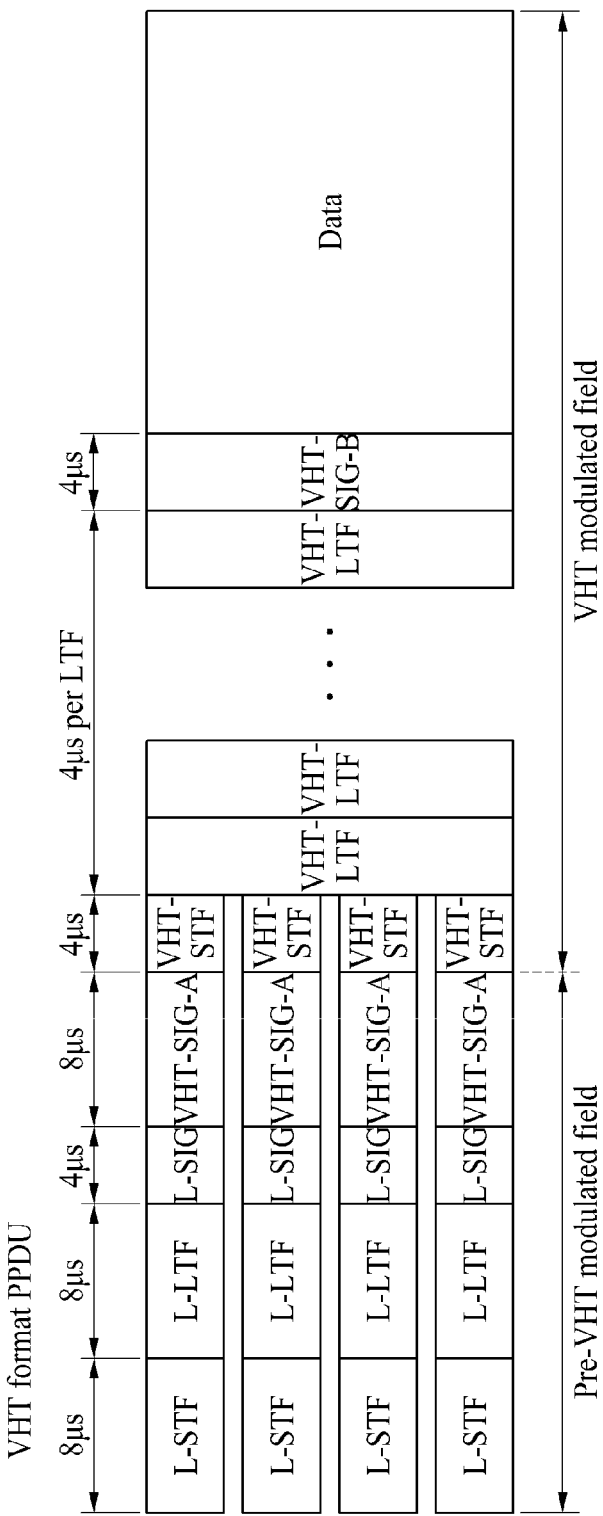
FIG. 7 illustrates a structure of a VHT PPDU of IEEE 802.11ac (VHT).
Figure 8:
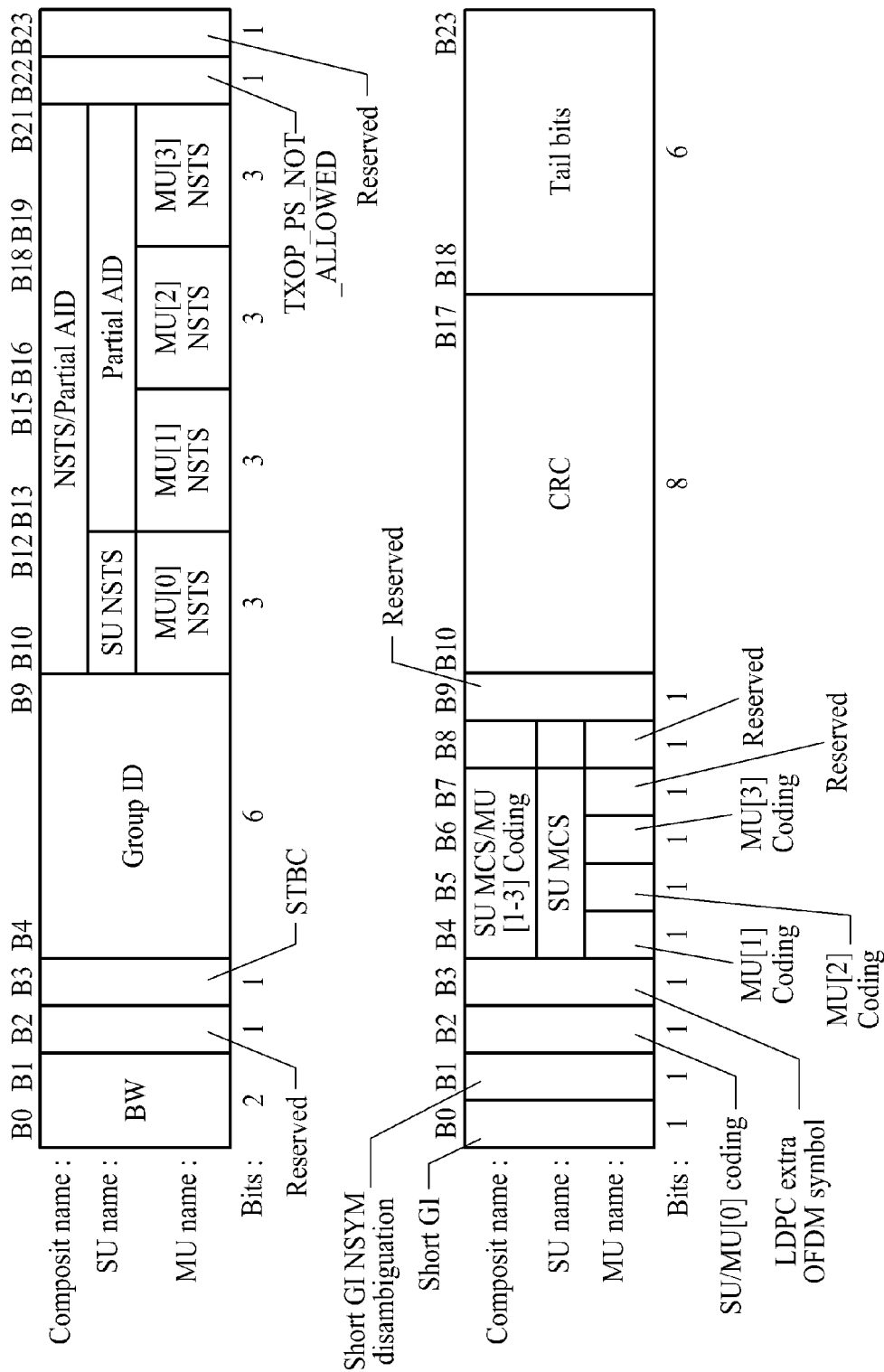
FIG. 8 illustrates a configuration of an IEEE 802.11ac VHT-SIG-A field.
Figure 9:
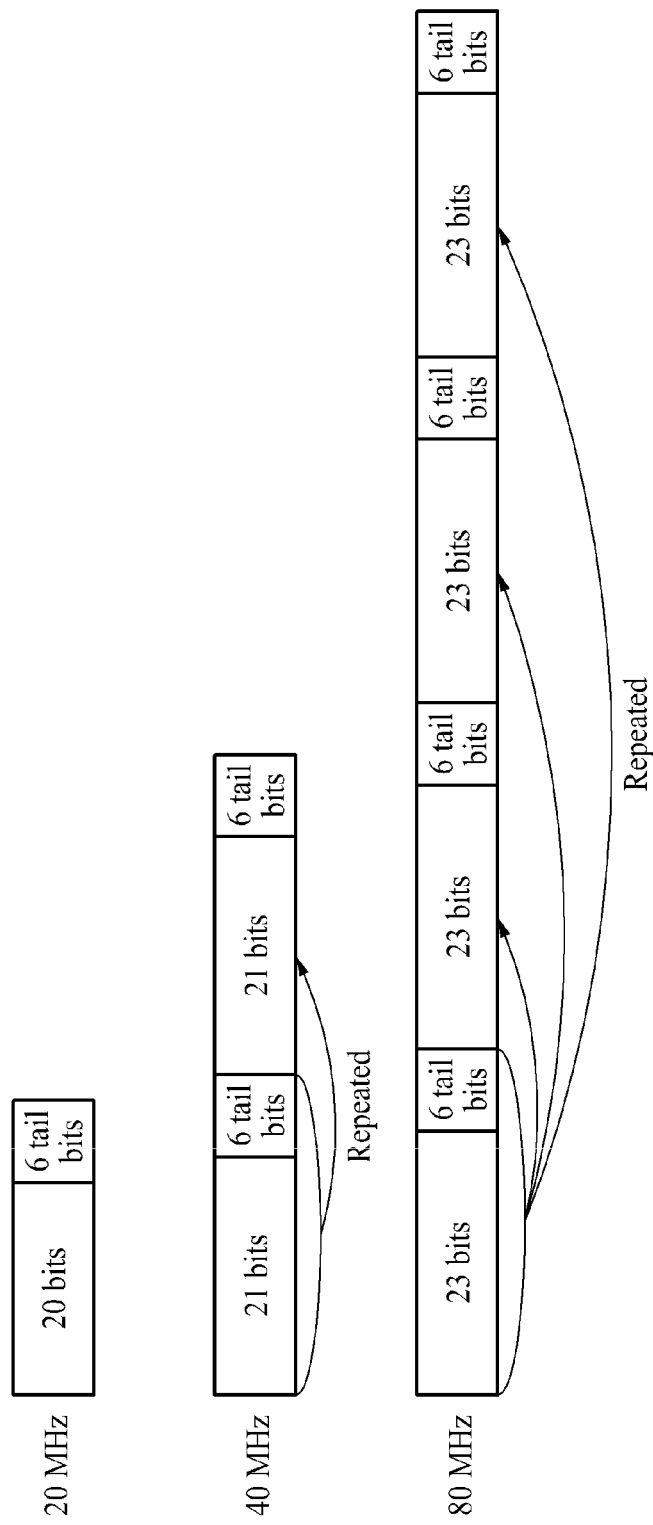
FIG. 9 illustrates a structure of an IEEE 802.11ac VHT-SIG-B field.

To prevent deterioration in frequency efficiency, a transmission apparatus may divide a frequency channel to simultaneously transmit data to a plurality of reception apparatuses. As illustrated in FIGS. 7 to 9 and Table 2, although an IEEE 802.11ac very high throughput (VHT) structure supports multi-user (MU)-MIMO, all transmission physical layer convergence procedure (PLCP) protocol data units (PPDUs) need to have the same bandwidth and bandwidth allocation follows the mode illustrated in FIG. 5 and Table 1, which may result in unsatisfactory frequency utilization efficiency.

FIG. 7 illustrates a structure of a VHT PPDU of IEEE 802.11ac (VHT). A pre-VHT modulated field is repeatedly transmitted by 20 MHz, and a VHT modulated field may be transmitted via beamforming. A transmission apparatus may transmit a transmission bandwidth, a transport stream, a channel coding scheme, a modulation and coding scheme (MCS), or the like using a signal field (L-SIG, VHT-SIG-A, VHT-SIG-B) so that a reception apparatus demodulates a transmitted signal. FIG. 8 illustrates a configuration of an IEEE 802.11ac VHT-SIG-A field. Referring to FIG. 8, the VHT-SIG-A field is divided for a single user (SU) and a multi-user (MU).

FIG. 9 illustrates a structure of an IEEE 802.11ac VHT-SIG-B field. Referring to FIG. 9, VHT-SIG-B is configured such that constituent bits are repeated with an increase in bandwidth. Table 2 illustrates a configuration of the VHT-SIG-B field.

Figure 10:
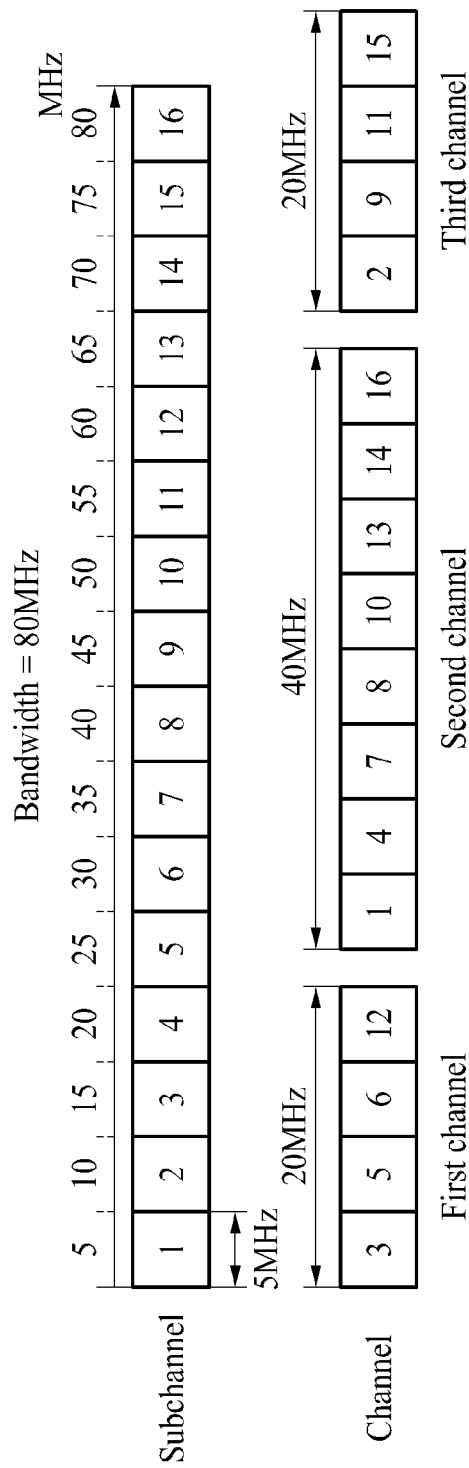
FIG. 10 is a diagram illustrating an example of a channel configuration in an Orthogonal Frequency-Division Multiple Access (OFDMA) mode.

FIG. 10 is a diagram illustrating an example of a channel configuration including a first channel, a second channel, and a third channel. A bandwidth (BW) is a frequency range used for a transmission apparatus to transmit data. A subchannel is a group of subcarriers, which represents a minimum allocation unit. A channel is a group of subchannels, which represents a basic unit transmitted to a particular reception apparatus. Adjacent or separate subchannels may be allocated as channels. In FIG. 10, a bandwidth is 80 MHz, a subchannel as a minimum allocation unit is 5 MHz, and channels in 20-MHz units are configured for a reception apparatus, that is, three channels including a 20-MHz first channel, a 40-MHz second channel and a 20-MHz third channel are configured.

Figure 11:
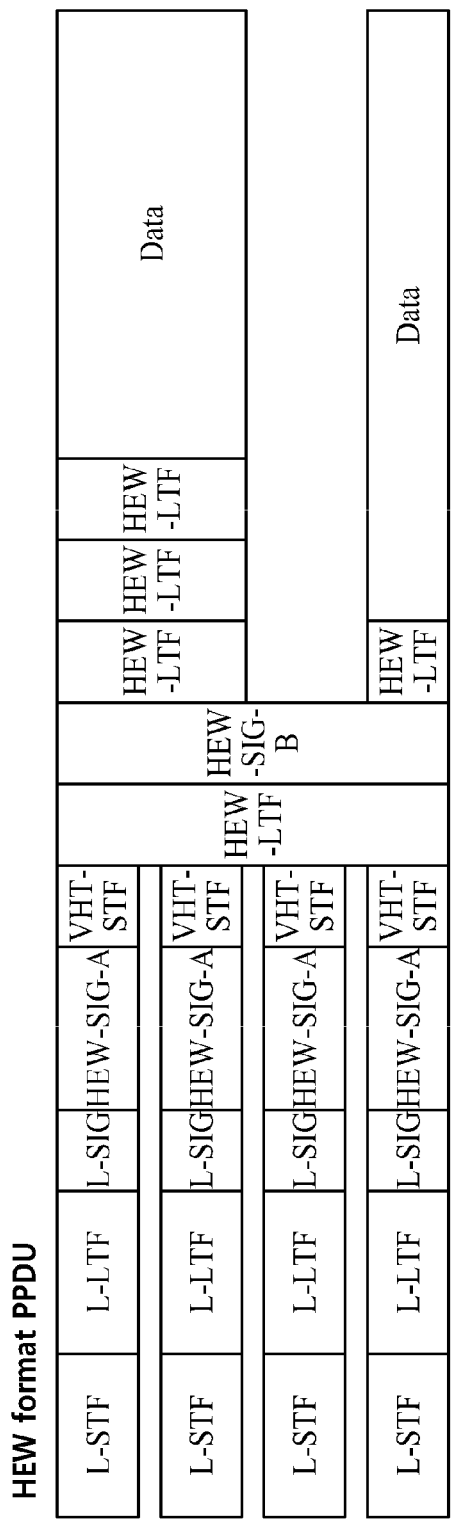
FIG. 11 is a diagram illustrating an example of an IEEE 802.11 HEW-format PPDU to which OFDMA is applicable.

FIG. 11 is a diagram illustrating an example of an IEEE 802.11 HEW-format PPDU to which OFDMA is applicable. Respective channels may be transmitted for different reception apparatuses and have different space-time streams, and thus may have different numbers of LTFs. To demodulate channels having different LTFs, HEW-SIG-B may be positioned next to a first HEW-LTF. The reception apparatuses using the respective channels may acquire parameters needed for reception including numbers of LTFs through information of HEW-SIG-B next to the first LTF.

Figure 12:
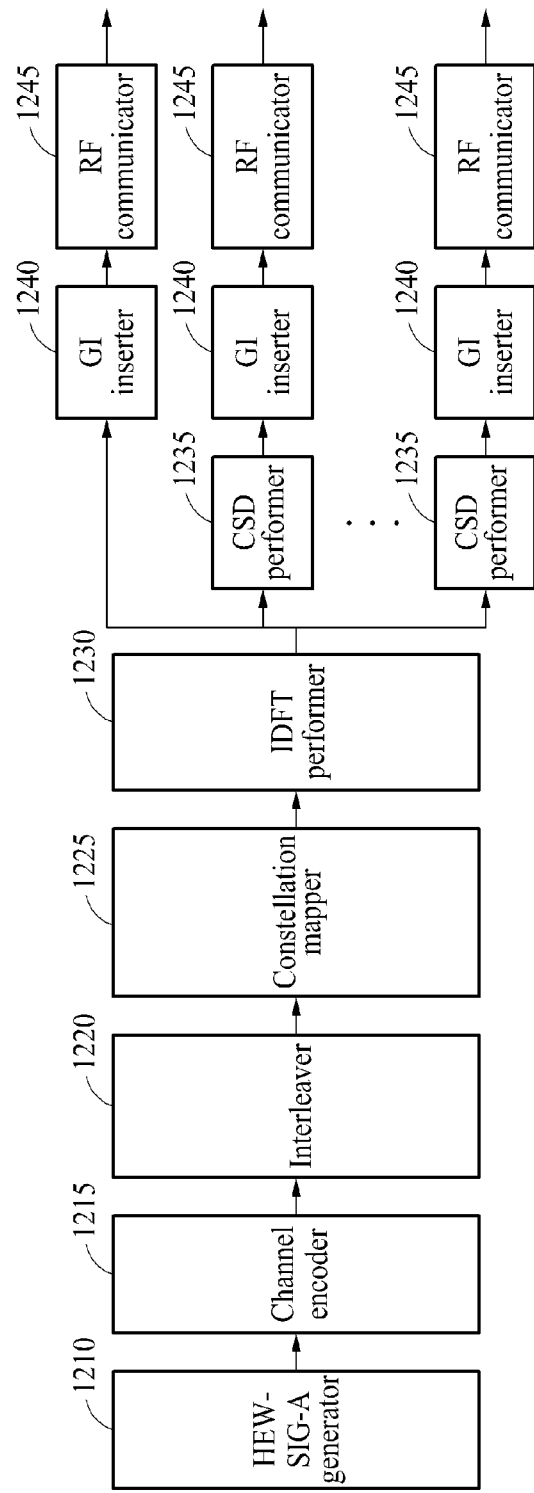
FIG. 12 is a diagram illustrating a process of transmitting HEW-SIG-A according to an embodiment.

FIG. 12 is a diagram illustrating a process of transmitting HEW-SIG-A according to an embodiment. Referring to FIG. 12, HEW-SIG-A may be transmitted by 20 MHz, and all reception apparatuses may be controlled to receive the same signal.

An HEW-SIG-A generator 1210 may generate a sequence configured in a combination of bits constituting the HEW-SIG-A field. The generated HEW-SIG-A sequence may be subjected to a channel encoder 1215 and an interleaver 1220 and be modulated by a constellation mapper 1225, and the modulated signal may be subjected to IDFT by an IDFT performer 1230. A CSD performer 1235 may perform CSD on the signal received from the IDFT performer 1230, and a GI inserter 1240 may insert a GI into the signal and perform windowing on the signal to transmit the signal may through an RF communicator 1245.

Figure 13:
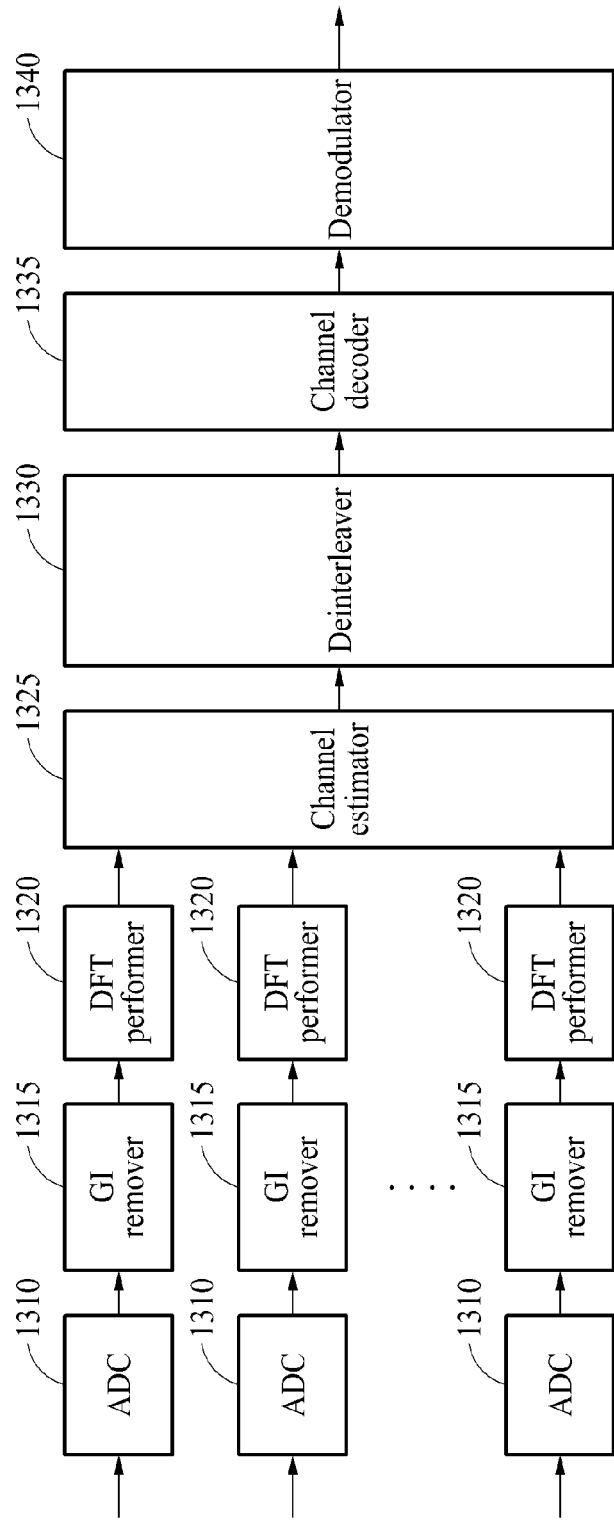
FIG. 13 is a diagram illustrating a process of receiving HEW-SIG-A according to an embodiment.

FIG. 13 is a diagram illustrating a process of receiving HEW-SIG-A according to an embodiment. Referring to FIG. 13, an analog-to-digital converter (ADC) 1310 may convert a signal received through receiving antennas into a digital signal. A GI remover 1315 may remove a GI from the digital signal. A DFT performer 1320 may perform DFT on the GI-removed signal.

A channel estimator 1325 may perform channel estimation on the DFT-processed signal using an LTF and perform signal detection based on a channel estimation result. When there is a plurality of receiving antennas, the channel estimator 1325 may combine detected signals. The detected

TABLE 2

| Field | VHT MU PPDU Allocation (bits) | | | VHT SU PPDU Allocation (bits) | | |
|---|---|---|---|---|---|---|
| | 20 MHz | 40 MHz | 80 MHz 160(80 + 80) MHz | 20 MHz | 40 MHz | 80 MHz 160(80 + 80) MHz |
| VHT-SIG-B Length | B0-B15 (16) | B0-B16 (17) | B0-B18 (19) | B0-B16 (17) | B0-B18 (19) | B0-B20 (21) |
| VHT-MCS | B16-B19 (4) | B17-B20 (4) | B19-B22 (4) | N/A | N/A | N/A |
| Reserved | N/A | N/A | N/A | B7-B19 (3) | B19-B20 (2) | B21-B22 (2) |
| Tail | B20-B25 (6) | B21-B26 (6) | B23-B28 (6) | B20-B25 (6) | B21-B26 (6) | B23-B28 (6) |
| Total bits | 26 | 27 | 29 | 26 | 27 | 29 |

FIG. 10 is a diagram illustrating an example of a channel configuration in an Orthogonal Frequency-Division Multiple Access (OFDMA) mode.

In order to increase frequency utilization efficiency in a WLAN system, for a plurality of reception apparatuses, a transmission apparatus may divide a bandwidth into channels to transmit data. FIG. 10 illustrates an example of dividing an 80-MHz bandwidth into three channels includsignal may be subjected to a deinterleaver 1330 and be channel-decoded by a channel decoder 1335. A demodulator 1340 may demodulate HEW-SIG-B and data using information included in the HEW-SIG-A sequence which is channel-decoded and demodulated.

Figure 14:
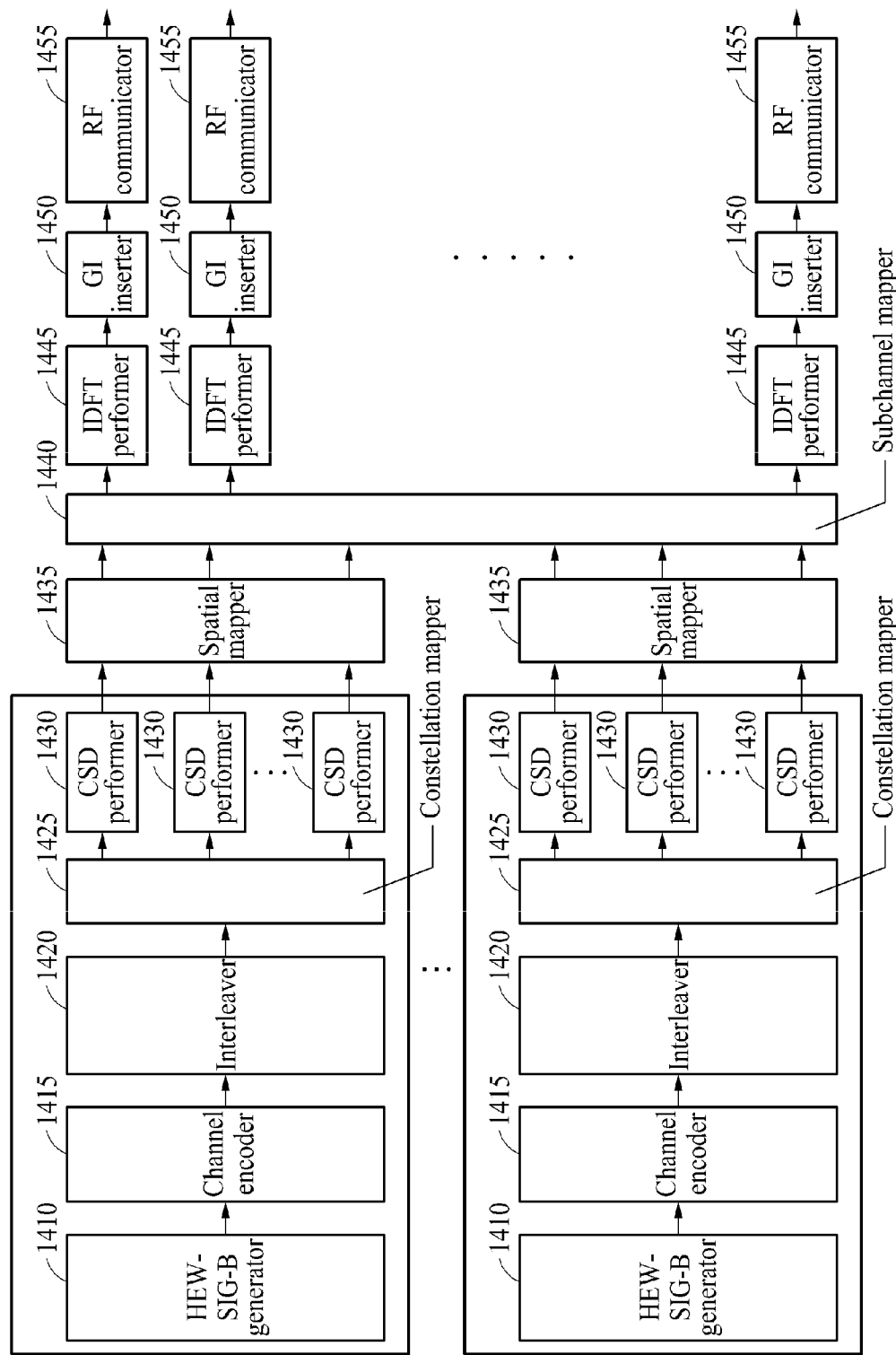
FIG. 14 is a diagram illustrating a process of transmitting HEW-SIG-B according to an embodiment.

FIG. 14 is a diagram illustrating a process of transmitting HEW-SIG-B according to an embodiment. Referring to FIG. 14, an HEW-SIG-B generator 1410 may generate an HEW-SIG-B sequence including different pieces of information by channels. The generated HEW-SIG-B sequence may be subjected to a channel encoder 1415 and an interleaver 1420 and be modulated by a constellation mapper 1425. The modulated signal may be subjected to a CSD performer 1430 and be mapped on a beamforming matrix by a spatial mapper 1435. Each signal mapped on a beamforming matrix may be mapped on a subchannel by a subchannel mapper 1440.

An IDFT performer 1445 may perform IDFT on the signal mapped on the subchannel, and a GI inserter 1450 may insert a GI into the IDFT-processed signal and perform windowing on the signal. The signal which is GI-inserted and subjected to windowing may be transmitted by an RF communicator 1455.

Figure 15:
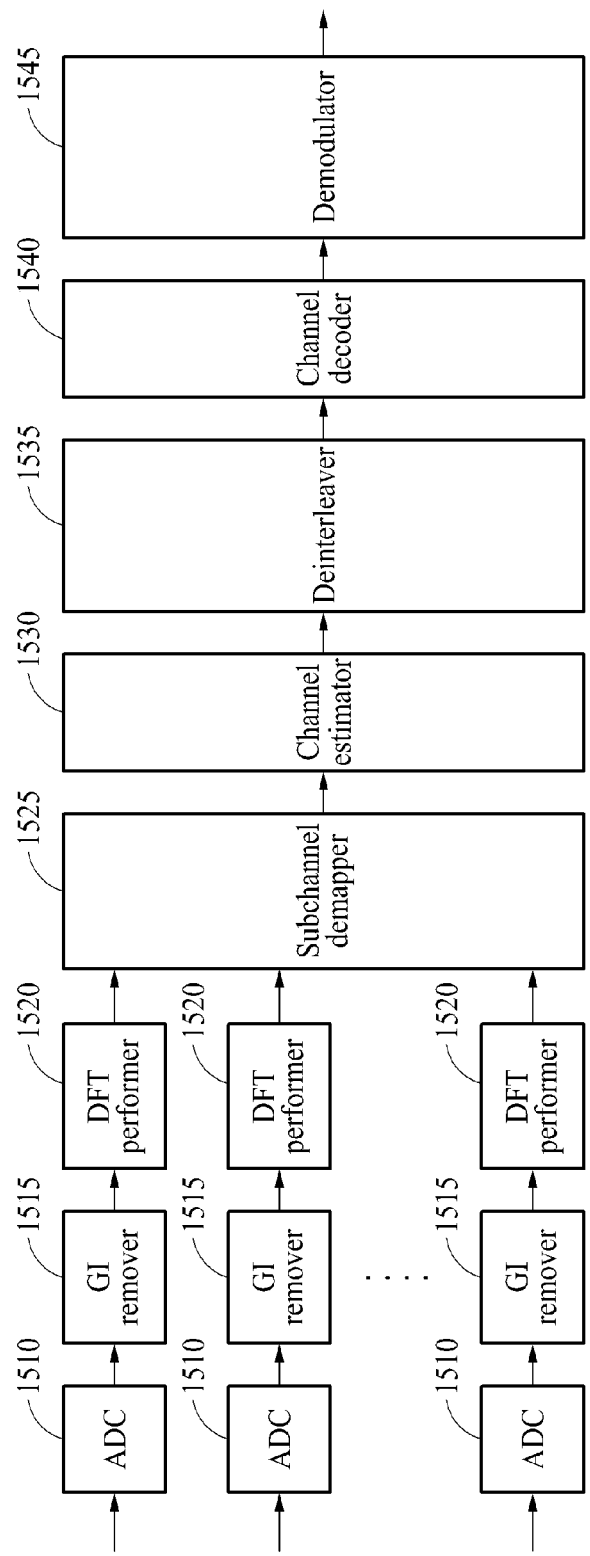
FIG. 15 is a diagram illustrating a process of receiving HEW-SIG-B according to an embodiment.

FIG. 15 is a diagram illustrating a process of receiving HEW-SIG-B according to an embodiment. Referring to FIG. 15, an ADC 1510 may convert a signal received through receiving antennas into a digital signal. A GI remover 1515 may remove a GI from the digital signal. A DFT performer 1520 may perform DFT on the GI-removed signal. A subchannel demapper 1525 may perform subchannel demapping on the DFT-processed signal.

A channel estimator 1530 may perform channel estimation on the subchannel demapping-processed signal using an LTF and perform signal detection based on a channel estimation result. The detected signal may be subjected to a deinterleaver 1535 and be channel-decoded by a channel decoder 1540. A demodulator 1540 may demodulate data using information included in HEW-SIG-B information which is channel-decoded and demodulated.

Hereinafter, embodiments of configuring HEW-SIG-A and HEW-SIG-B to improve frequency utilization efficiency will be described. Positions and bits of elements constituting HEW-SIG-A and HEW-SIG-B illustrated in the embodiments may vary, and reserved fields may include information on elements necessary for transmission and reception of data which is not stated in this specification.

First Embodiment

An illustrative bit configuration of HEW-SIG-A is described as follows.

In one example, bits included in HEW-SIG-A to support OFDMA are illustrated in Table 3 below.

TABLE 3

| Name | Illustrative number of bits | Note |
| --- | --- | --- |
| OFDMA | 1 | Bit to indicate OFDMA 0: OFDMA, 1: SU, MU |
| OFDMA NSTS | 16 | Number of space-time streams (NSTS) of channels simultaneously transmitted in OFDMA mode B6~B9: NSTS of first STA B10~13: NSTS of second STA B14~B17: NSTS of third STA B18~B21: NSTS of fourth STA |

TABLE 3-continued

| Name | Illustrative number of bits | Note |
| --- | --- | --- |
| OFDMA [0-3] coding | 1 | Coding modes of channels simultaneously transmitted in OFDMA mode OFDMA[0] coding: Coding mode of first channel OFDMA[1] coding: Coding mode of second channel OFDMA[2] coding: Coding mode of third channel OFDMA[3] coding: Coding mode of fourth channel |

Figure 16:
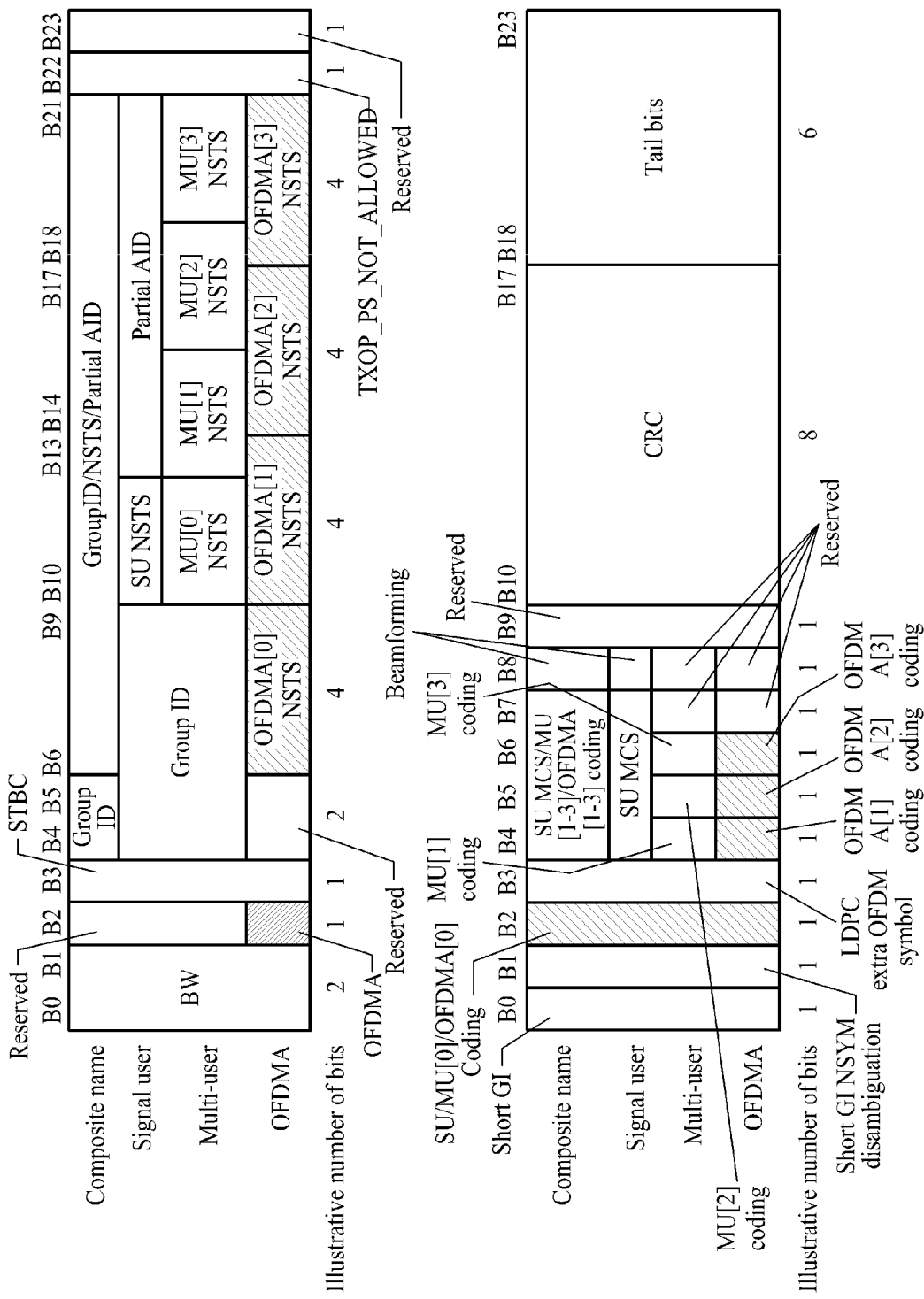
FIGS. 16 and 17 are diagrams illustrating examples of an HEW-SIG-A structure according to a first embodiment.
Figure 17:
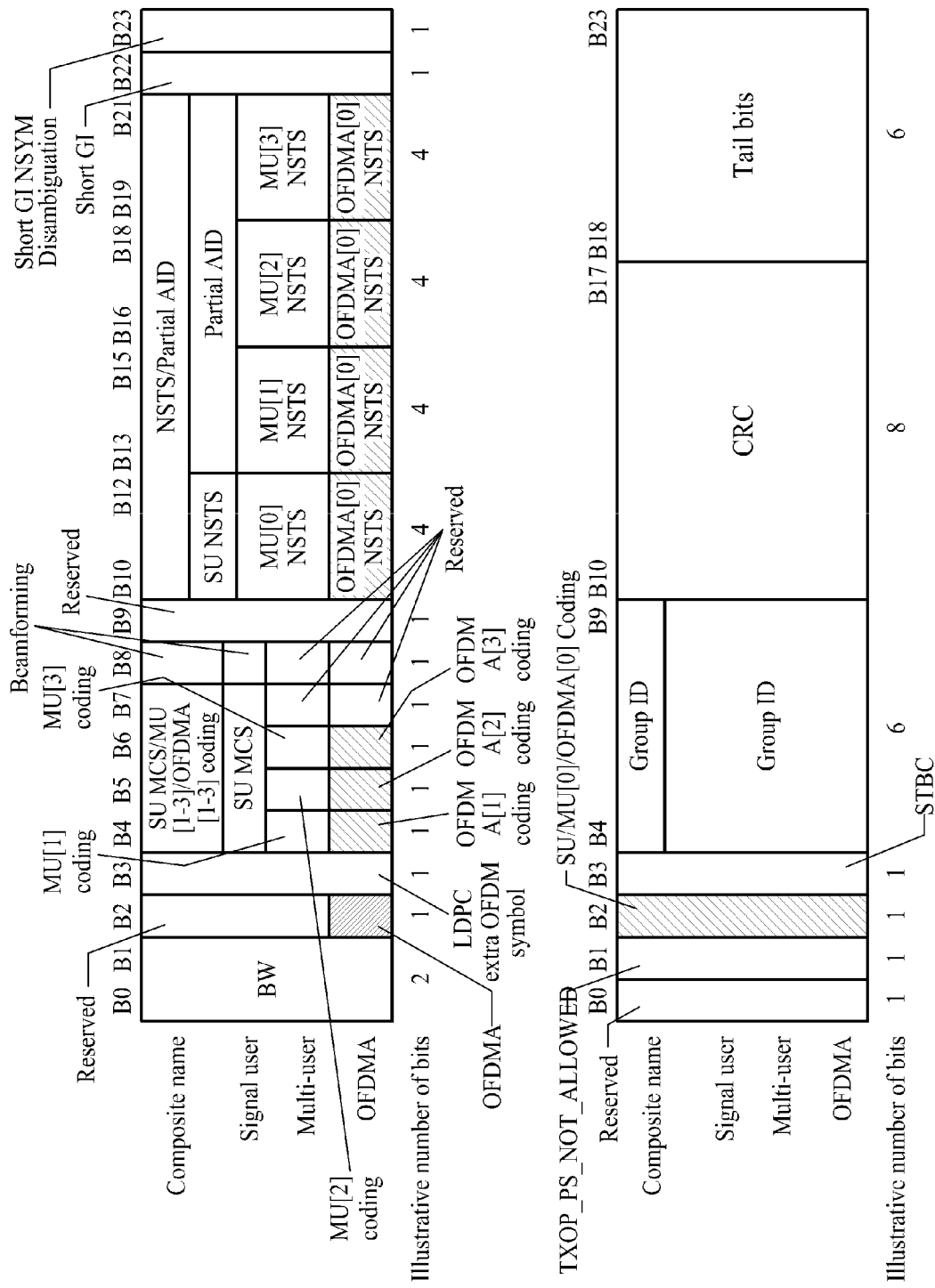

FIG. 16 illustrates an example of an HEW-SIG-A structure according to a first embodiment, and FIG. 17 illustrates another example of an HEW-SIG-A structure according to the first embodiment. FIGS. 16 and 17 illustrate numbers of bits necessary for each element, which may vary depending on embodiments. Bits indicating OFDMA of HEW-SIG-A may be allocated in random numbers to random positions according to configurations based on parameters necessary for transmission.

A reception apparatus needs allocation structure information on which channel is allocated to the reception apparatus in order to demodulate a signal transmitted in OFDMA. Referring to FIG. 9, 54 bits may be used in a 40-MHz band, and 117 bits may be used in an 80-MHz band. When it is possible to transmit a channel by 20 MHz, data transmission is possible with up to two reception apparatuses in a 40-MHz bandwidth, and data transmission is possible with up to four reception apparatuses in an 80-MHz bandwidth.

Hereinafter, examples of an HEW-SIG-B structure according to the first embodiment will be described.

HEW-SIG-B Structure in a Case of a Channel of Adjacent Subchannels

HEW-SIG-B may be transmitted using a bandwidth indicated by a bit of a BW field of HEW-SIG-A. A reception apparatus may estimate a channel based on a first HEW-LTF of the BW field indicated in HEW-SIG-A and demodulate HEW-SIG-B.

Figure 18:
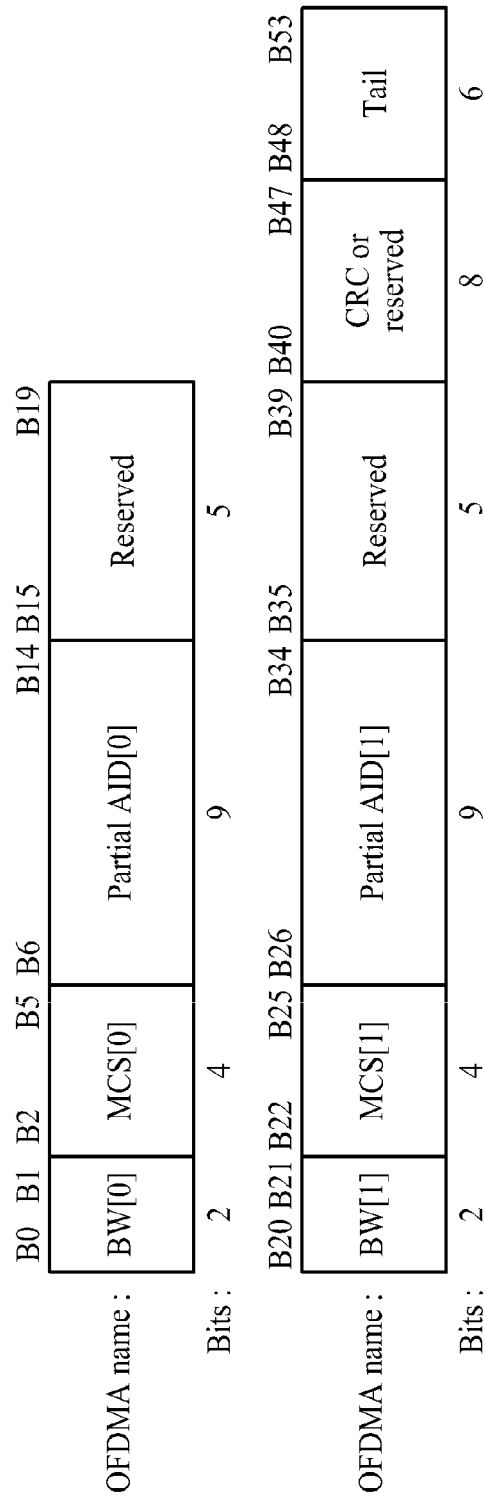
FIG. 18 is a diagram illustrating an example of an HEW-SIG-B structure in a case where a channel is allocated adjacent subchannels in a 40-MHz bandwidth according to the first embodiment.

FIG. 18 illustrates an example of an HEW-SIG-B structure in a case where a channel is allocated adjacent subchannels in a 40-MHz bandwidth according to the first embodiment. Referring to FIG. 18, when partial association identifier (AID)[n] indicates a reception apparatus, the reception apparatus selects BW[n] and MCS[n]. When there is no partial AID indicating the reception apparatus, the reception apparatus terminates reception to save power. In a cyclic redundancy checking (CRC) field of the HEW-SIG-B structure, other elements needed for CRC or transmission and reception may be added or reserved bits may be allocated. Illustrated is an example of an HEW-SIG-B structure in a case where a channel is allocated adjacent subchannels in an 80-MHz bandwidth.

Illustrative structures of a BW field, an MCS field, a partial AID field, and an OFDMA pattern are in Table 4. Table 4 illustrates an example of an HEW-SIG-B structure according to the foregoing embodiments.

TABLE 4

| Name | Illustrative number of bits | Note |
| --- | --- | --- |
| BW field | 8 | Bandwidth used by each channel in OFDMA mode, using 2 bits for each channel<br>Ex)<br>00: 20 MHz<br>01: 40 MHz<br>10: 80 MHz<br>11: 160(80 + 80)MHz |
| MCS field | 16 | Modulation and coding used by each channel in OFDMA mode, using 4 bits for each channel<br>Ex)<br>0000: BPSK 1/2<br>0001: QPSK 1/2<br>0010: QPSK 3/4<br>0011: 16 QAM 1/2<br>0100: 16 QAM 3/4<br>0101: 64 QAM 2/3<br>0110: 64 QAM 3/4<br>0111: 64 QAM 5/6<br>1000: 256 QAM 3/4<br>1001: 256 QAM 5/6 |
| Partial AID field | 36 | Partial AID used by each channel in OFDMA mode, using 9 bits for each channel (a reception apparatus verifies using partial AID whether a signal is transmitted to the reception apparatus to save power)<br>Ex)<br>Partial AID [0]: Partial AID of first channel<br>Partial AID [1]: Partial AID of second channel<br>Partial AID [2]: Partial AID of third channel<br>Partial AID [3]: Partial AID of fourth channel |

An HEW-SIG-B structure in a bandwidth of 80 MHz or greater may be easily extended from relationships between FIGS. 18 and 19. FIG. 19 is a diagram illustrating an example of an HEW-SIG-B structure in a case where a channel is allocated adjacent subchannels in an 80-MHz bandwidth according to the first embodiment.

A reception apparatus may verify whether a PPDU operates in OFDMA based on bits of HEW-SIG-A indicating whether an OFDMA operation is performed and identify a space-time stream of each station from OFDMA NSTS. Further, the reception apparatus may identify a coding mode of each station from OFDMA coding. For instance, an example of extracting reception parameters using HEW-SIG-A and HEW-SIG-B in the foregoing embodiments is illustrated in Table 5.

TABLE 5

| OFDMA | OFDMA NSTS [0-3] | Effective OFDMA coding [0-3] | Effective BW[0-3], MCS[0-3], Partial AID[0-3] |
| --- | --- | --- | --- |
| 1: OFDMA mode | [4, 2, 0, 0]: Transmitted with two channels First channel uses four STSs Second channel uses two STSs | [0, 1, 0, 1]: Transmitted with two channels, and thus first two bits are valid (OFDMA NSTS of 0 means no transmission) | Transmitted with first two channels, and thus bits for first two channels are valid |
| 1: OFDMA mode | [2, 1, 1, 0]: Transmitted with three channels | [0, 1, 0, 1]: Transmitted with three channels, and thus first three bits are valid | Transmitted with first three channels, and thus bits for first three channels are valid |

TABLE 5-continued

| OFDMA | OFDMA NSTS [0-3] | Effective OFDMA coding [0-3] | Effective BW[0-3], MCS[0-3], Partial AID[0-3] |
| --- | --- | --- | --- |
| 1: OFDMA mode | [2, 1, 1, 2]: Transmitted with four channels | [0, 1, 0, 1]: Transmitted with four channels, and thus first four bits are valid | Transmitted with four channels, and thus bits for four channels are valid |

HEW-SIG-B Structure in a Case of a Channel of Subchannels Not Adjacent

When a channel is formed of adjacent subchannels as described above, a position occupied by each channel in the entire bandwidth may be easily verified by identifying a bandwidth used by the channel. However, when a channel is formed of subchannels not adjacent, there can be various combinations of subchannels constituting the channel, and thus a reception apparatus needs to recognize possible combinations of subchannels in advance and it is necessary to indicate information on which combination is used in PPDU transmission through HEW-SIG-B. In the following description, a subchannel has a bandwidth of 20 MHz, without being limited thereto.

Figure 20:
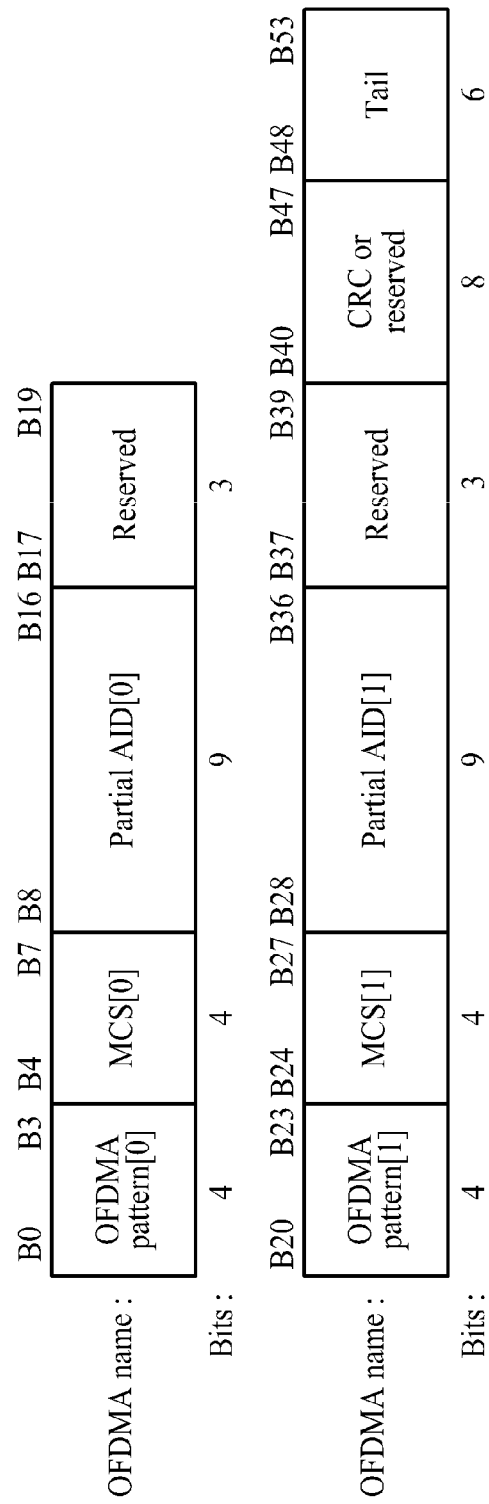
FIG. 20 is a diagram illustrating an example of an HEW-SIG-B structure in a case where a channel is allocated subchannels not adjacent in a 40-MHz bandwidth according to the first embodiment.
Figure 21:
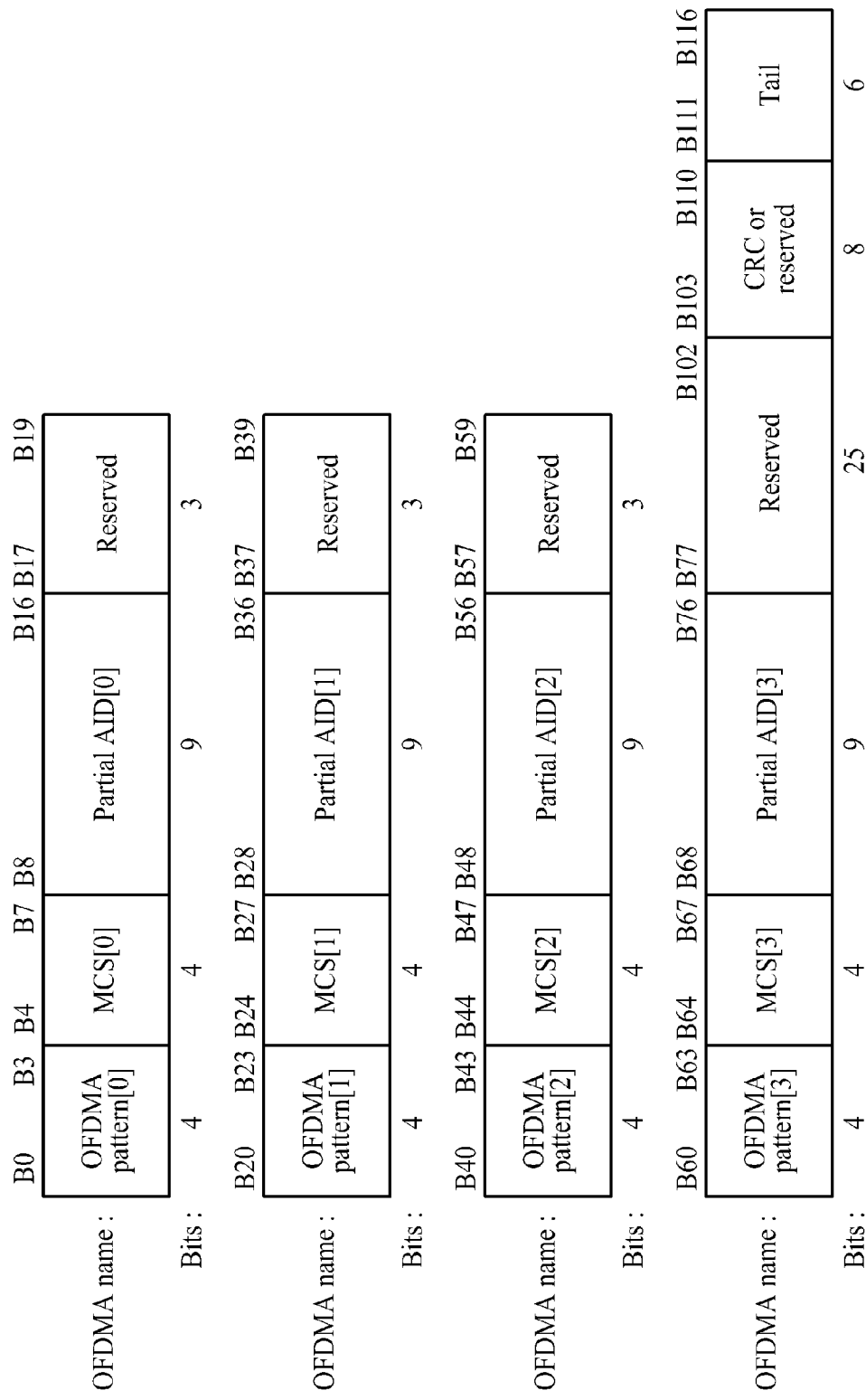
FIG. 21 is a diagram illustrating an example of an HEW-SIG-B structure in a case where a channel is allocated subchannels not adjacent in an 80-MHz bandwidth according to the first embodiment.

FIG. 20 illustrates an example of an HEW-SIG-B structure in a case where a channel is allocated subchannels not adjacent in a 40-MHz bandwidth according to the first embodiment. In the HEW-SIG-B structure of FIG. 20, channel allocation is possible for up to two reception apparatuses. FIG. 21 illustrates an example of an HEW-SIG-B structure in a case where a channel is allocated subchannels not adjacent in an 80-MHz bandwidth according to the first embodiment. In the HEW-SIG-B structure of FIG. 21, channel allocation is possible for up to four reception apparatuses.

Illustrative structures of a BW field, an MCS field, a partial AID field, and an OFDMA pattern are in Table 6. Table 4 illustrates an example of an HEW-SIG-B structure according to the present embodiment.

TABLE 6

| Name | Maximum number of bits | Note |
| --- | --- | --- |
| OFDMA pattern | 16 | Allocation structure in 20-MHz channel units used by each channel in OFDMA mode, using 4 bits for each channel<br>Ex)<br>Indicate 80 MHz in terms of position in a bitmap format in 20-MHz unit<br>When 20 MHz is allocated: 1000, 0100, 0010, 0001<br>When 40 MHz is allocated: 1100, 1010, 1001, 0110, 0101, 0011<br>When 80 MHz is allocated: 1111 |
| MCS | 16 | Same as in Table 4 |
| Partial AID | 36 | Same as in Table 4 |

A reception apparatus may verify whether a PPDU operates in OFDMA based on OFDMA bits of HEW-SIG-A and identify a space-time stream of each channel from OFDMA NSTS. Further, the reception apparatus may identify a coding mode of each channel from OFDMA coding. In the present embodiment, unlike in the channel of the adjacent subchannels, a wireless communication apparatus may indicate using a four-bit OFDMA pattern, instead of a two-bit BW, that subchannels not adjacent are allocable. For example, when first and fourth channels among channels in 20-MHz units are used, an OFDMA pattern mapped on [1001] may be received.

HEW-SIG-B Structure When Allocation in 20-MHz or Lower Subchannel and Symbol Unit is Possible When a signal-to-interference-plus-noise ratio (SINR) or channel characteristics are identified by 20 MHz or lower, a subchannel unit may be 20 MHz or lower and transmitting data using a channel with a good SINR improves reception performance of a reception apparatus. When subchannels in 20 MHz or lower are allocated, various combinations for channel configurations may be created and information on a channel configuration may be transmitted through bits of an OFDMA pattern of HEW-SIG-B.

Figure 22:
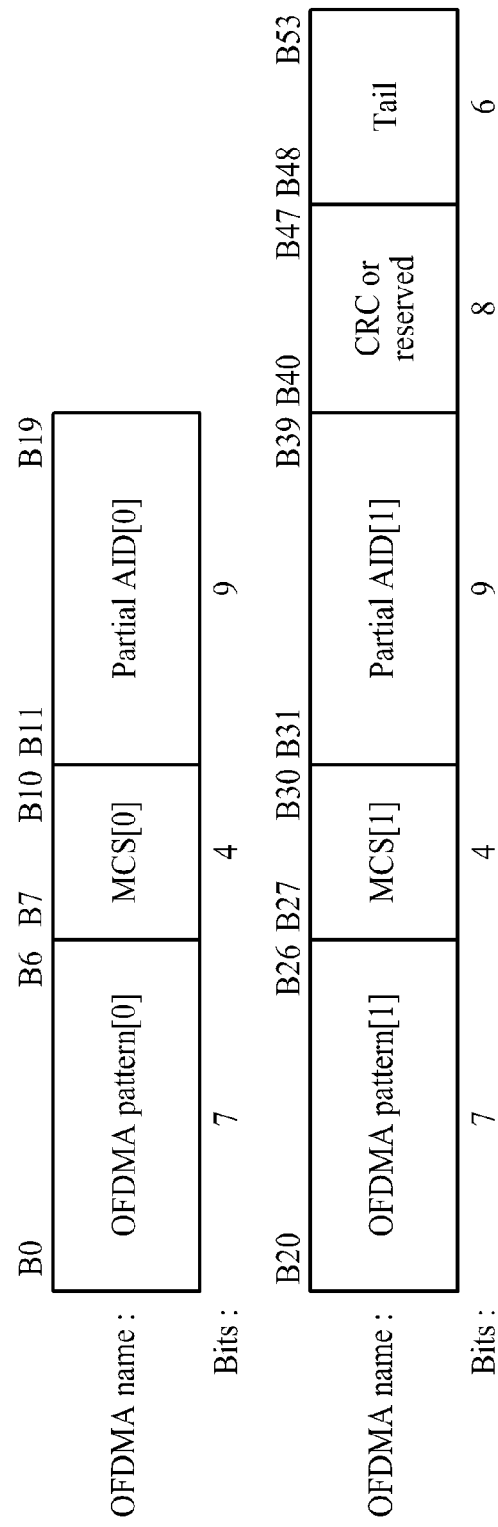
FIG. 22 is a diagram illustrating an example of an HEW-SIG-B structure in a case where allocation is performed by subchannel or subchannel/symbol in a 40-MHz bandwidth according to the first embodiment.

FIG. 22 is a diagram illustrating an example of an HEW-SIG-B structure in a case where allocation is performed by subchannel or subchannel/symbol in a 40-MHz bandwidth according to the first embodiment. Referring to FIG. 22, the HEW-SIG-B structure illustrated in FIG. 22 may also be easily extended in an 80-MHz bandwidth or greater as in the relationships between FIGS. 18 and 19. An OFDMA pattern has, for example, seven bits but may have smaller or greater bits than seven bits.

Figure 23A:
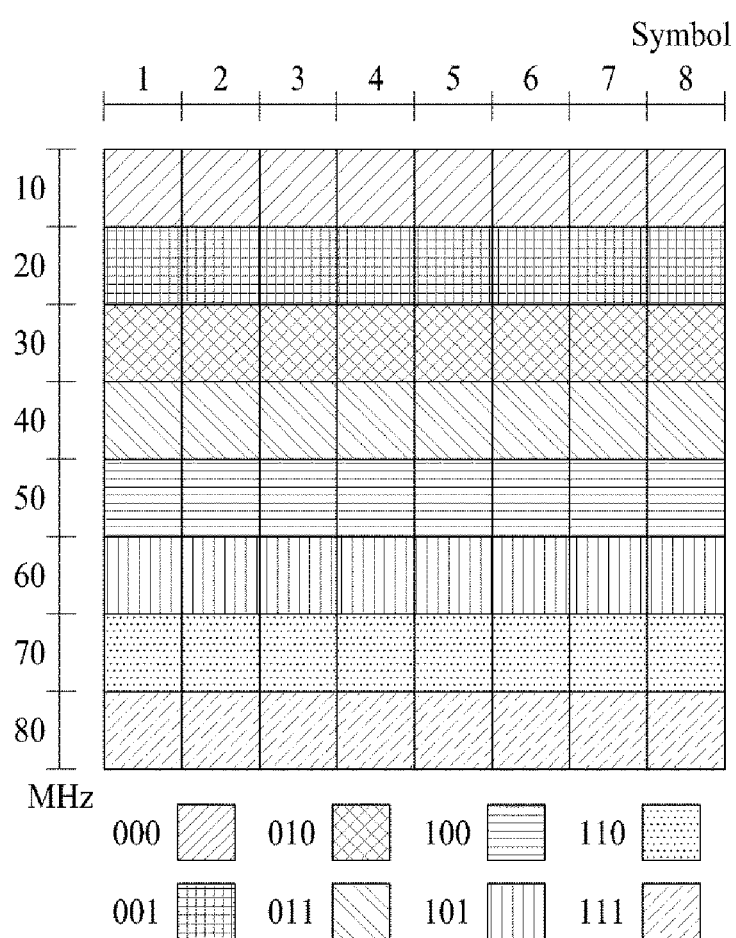
FIGS. 23A and 23B are diagrams illustrating examples of dividing an 80-MHz bandwidth into 10-MHz subchannels and symbols according to the first embodiment.
Figure 23B:
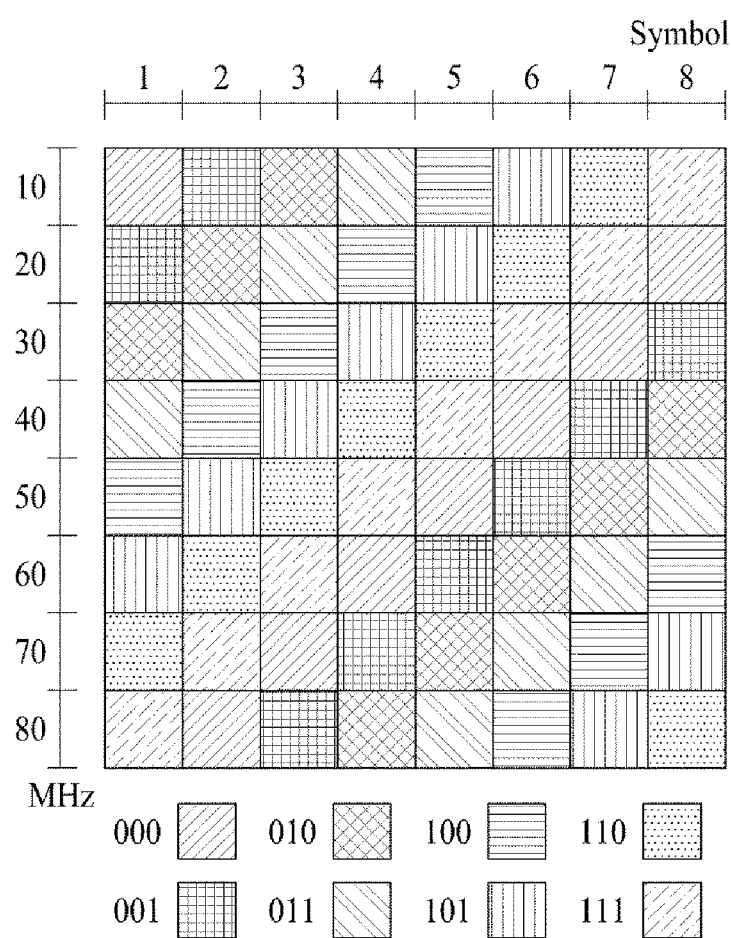

FIGS. 23A and 23B are diagrams illustrating examples of dividing an 80-MHz bandwidth into 10-MHz subchannels and symbols according to the first embodiment. FIG. 23A and FIG. 23B illustrate structures when a bandwidth is 80 MHz and subchannels are allocable by 10 MHz. Although FIG. 23A illustrates an example in which the same subchannel allocated to a first symbol is allocable without any change depending on a symbol and FIG. 23B illustrates an example in which an allocated subchannel may vary depending on a symbol, a bandwidth may be configured variously.

A subchannel allocation mode may be configured with the example of FIG. 23A, the example of FIG. 23B or in combination of these examples. Subchannel allocation information (subchannel allocation information indicated by the bits of the OFDMA pattern) may be identified by a transmission apparatus and a reception apparatus in an information exchange process upon initial connection. The reception apparatus may identify the subchannel allocation information from the bits of the OFDMA pattern upon transmission and reception of data.

Table 7 illustrates an example of allocation of subchannels and symbols identified from the OFMDA pattern in the present embodiment.

TABLE 7

| Number of STAs involved in simultaneous transmission | Bandwidth (MHz) | OFDMA pattern | Allocated subchannel (FIG. 23) |
|---|---|---|---|
| 2 | 40 | 0010001 | {000,010, 011, 111} |
|  | 20 | 1010000 | {110} |
| 3 | 20 | 0110101 | {010} |
|  | 40 | 1000110 | {001, 100, 101, 111} |
|  | 20 | 0101101 | {000} |

In the foregoing description, a channel is allocated by 20 MHz but is not limited thereto.

Second Embodiment

Figure 24:
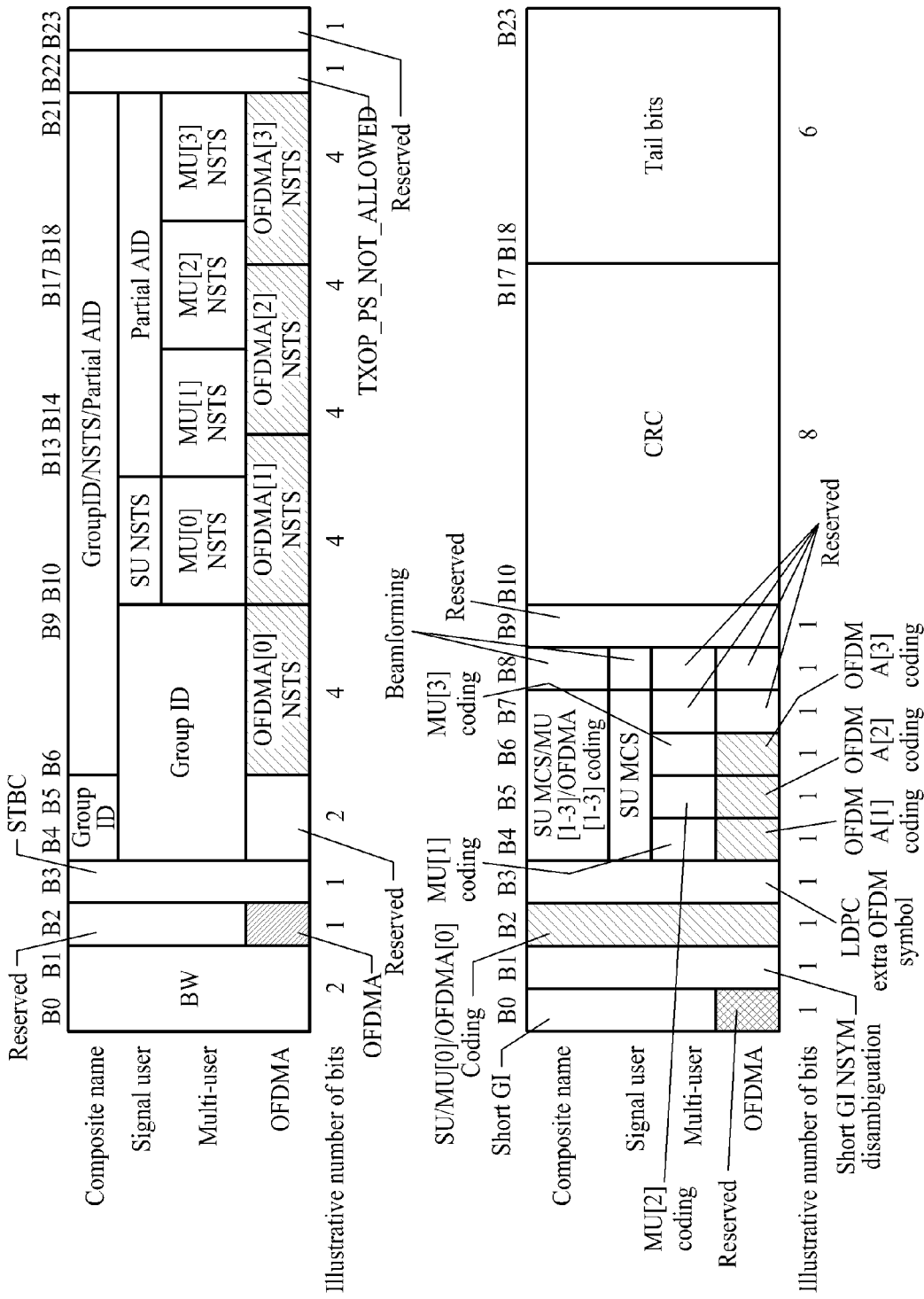
FIG. 24 is a diagram illustrating an example of an HEW-SIG-A structure according to a second embodiment.

FIG. 24 is a diagram illustrating an example of an HEW-SIG-A structure according to a second embodiment, which is an example of an HEW-SIG-A structure in a case where a short GI may be different by channel. As in relationships between FIGS. 16 and 17, bits and positions of composite names in FIG. 24 may be modified variously.

Figure 25:
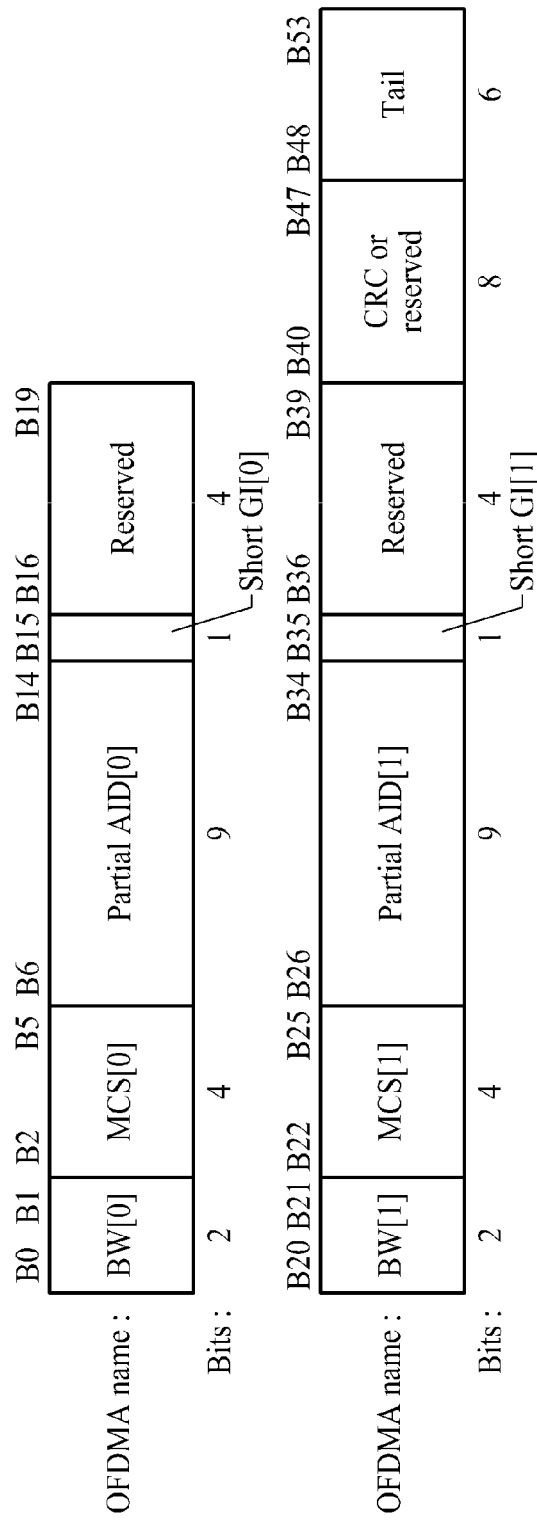
FIGS. 25 to 27 are diagrams illustrating examples of an HEW-SIG-B structure according to the second embodiment.
Figure 26:
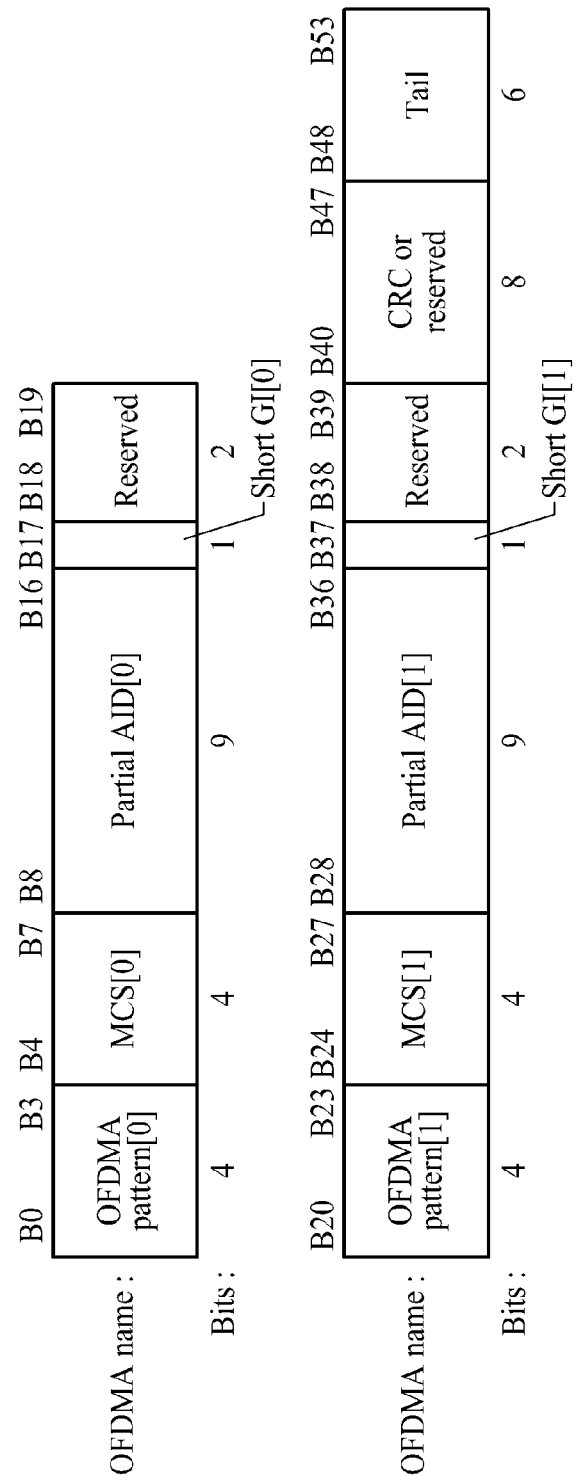
Figure 27:
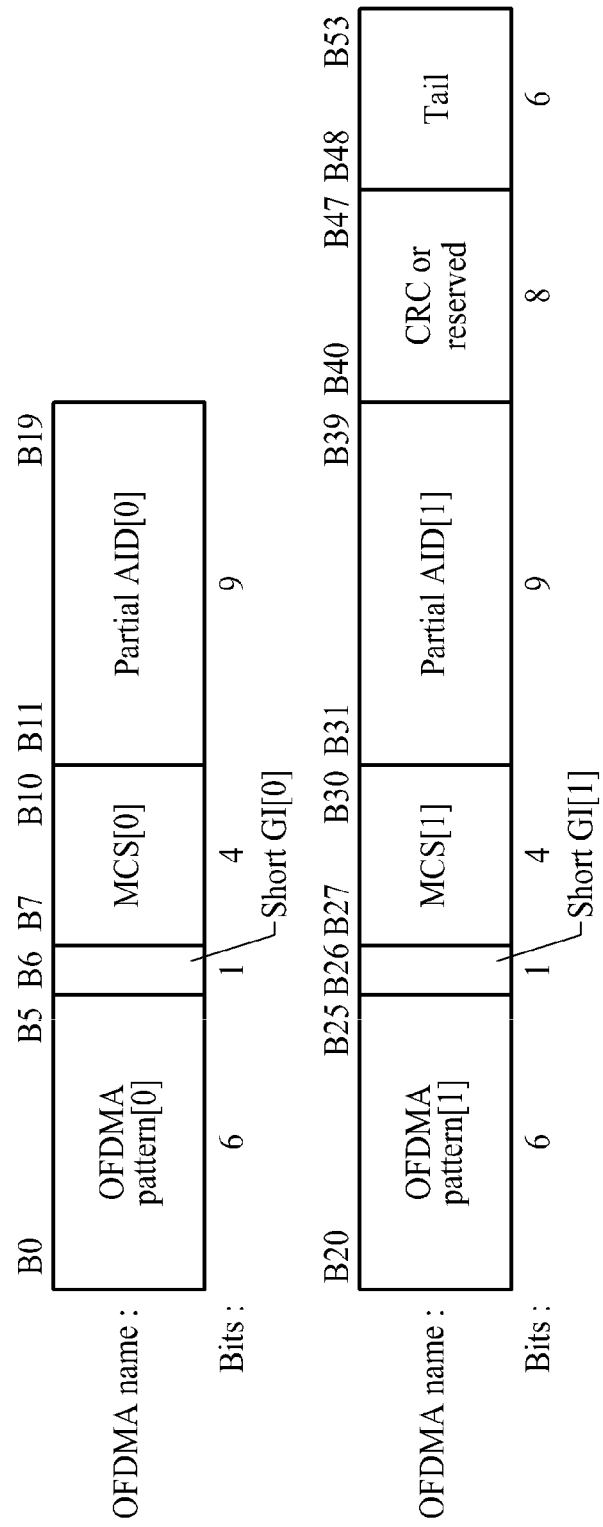

FIG. 25 is a diagram illustrating an example of an HEW-SIG-B structure according to the second embodiment, which is an example of an HEW-SIG-B structure in a 40-MHz bandwidth. Inserting a short GI into HEW-SIG-B for each channel may extend the structure as in FIGS. 26 and 27 by adjusting reserved bits and bits for an OFDMA pattern of FIGS. 20 and 22 even when the OFDMA pattern is used instead of a BW. FIGS. 26 and 27 are diagrams illustrating other examples of an HEW-SIG-B structure according to the second embodiment. The HEW-SIG-B structures illustrated in FIGS. 25 to 27 may be extended for a frequency band with a bandwidth of 80 MHz or greater as in the relationships between FIGS. 18 and 19.

Third Embodiment

Figure 28:
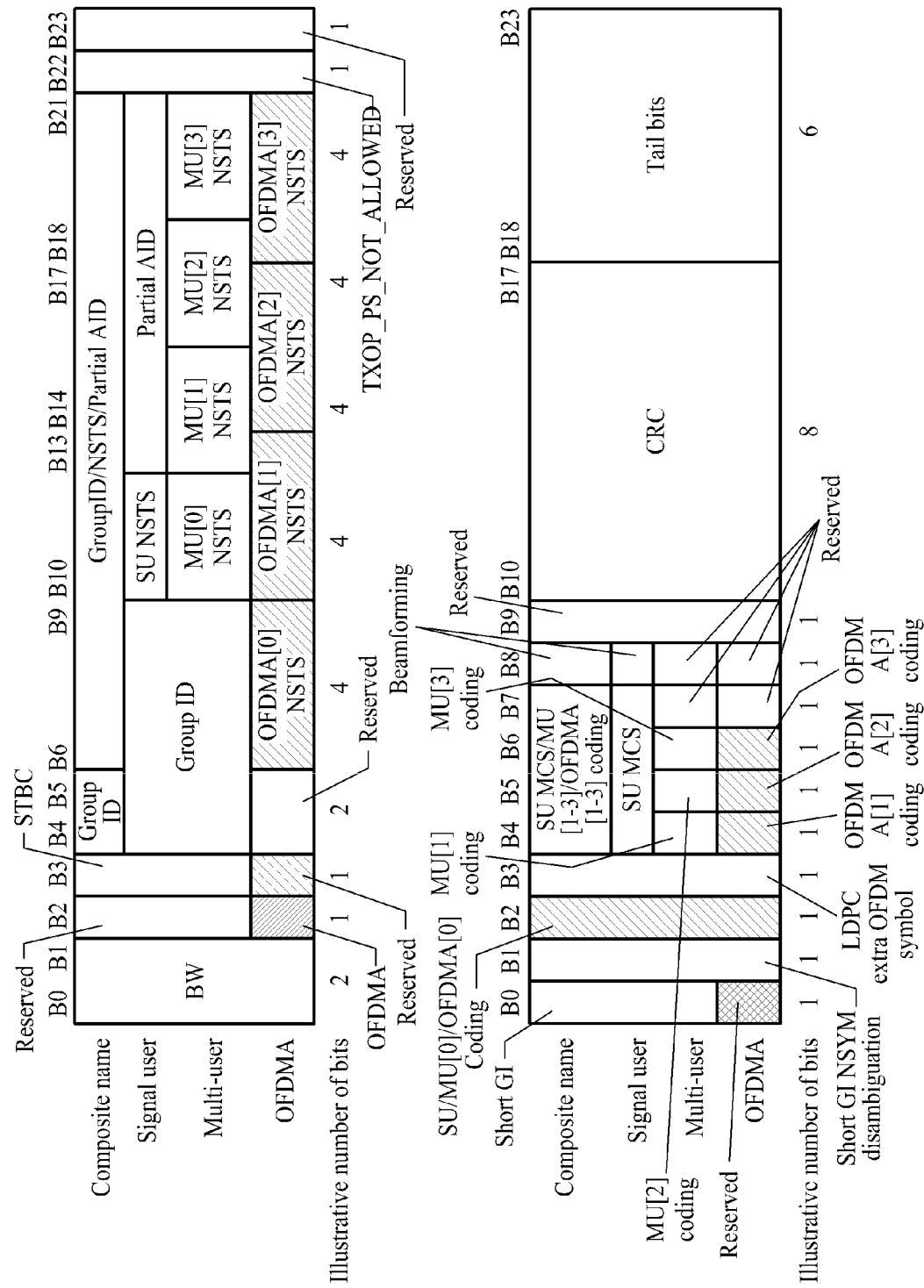
FIG. 28 is a diagram illustrating an example of an HEW-SIG-A structure according to a third embodiment.

FIG. 28 is a diagram illustrating an example of an HEW-SIG-A structure according to a third embodiment, which is an example of an HEW-SIG-A structure in a case where space-time block coding (STBC) may be different by channel. As in the relationships between FIGS. 16 and 17, bits and positions of composite names in FIG. 24 may be modified variously.

Figure 29:
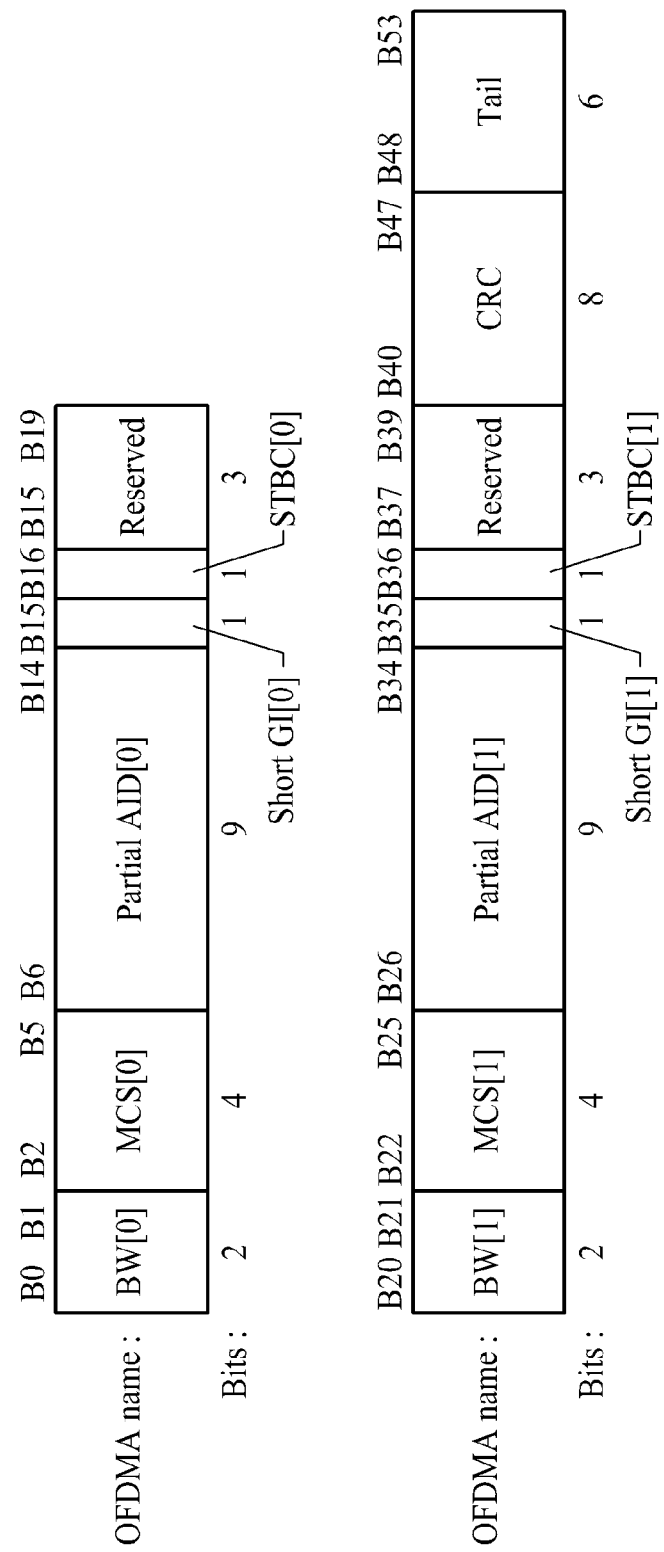
FIG. 29 is a diagram illustrating an example of an HEW-SIG-B structure according to the third embodiment.

FIG. 29 is a diagram illustrating an example of an HEW-SIG-B structure according to the third embodiment, which is an example of an HEW-SIG-B structure in a 40-MHz bandwidth. The HEW-SIG-B structure illustrated in FIG. 29 may be extended for a band with a bandwidth of 80 MHz or greater as in the relationships between FIGS. 18 and 19. Further, inserting STDB into HEW-SIG-B for each reception apparatus may extend the structure by adjusting reserved bits and bits for an OFDMA pattern of FIGS. 20 and 22 even when the OFDMA pattern is used instead of a BW.

Fourth Embodiment

Figure 30:
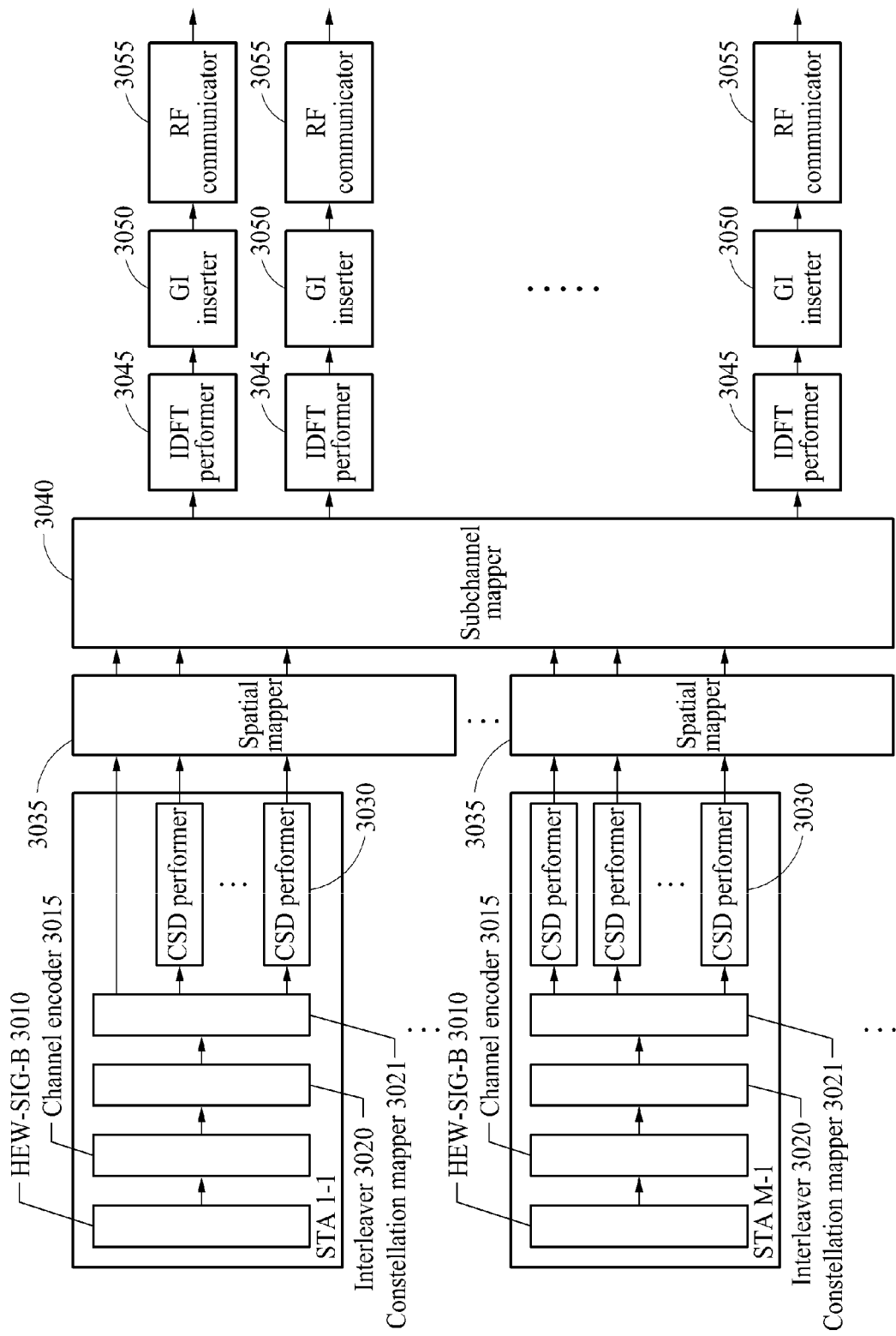
FIG. 30 is a diagram illustrating a transmission process in a case where OFDMA and MU-MIMO are combined according to a fourth embodiment.

FIG. 30 is a diagram illustrating a transmission process in a case where OFDMA and MU-MIMO are combined according to a fourth embodiment. Referring to FIG. 30, a bandwidth may be divided into a plurality of channels and each channel may be occupied by a plurality of stations, not a single station, so that MU-MIMO transmission by channel may be performed.

An HEW-SIG-B generator 3010 may generate an HEW-SIG-B sequence including different pieces of information by channels. The HEW-SIG-B sequence may be generated as many as a number of stations determined to be involved in transmission by each channel. The generated HEW-SIG-B sequence may be subjected to a channel encoder 3015 and an interleaver 3020 and be modulated by a constellation mapper 3025. The modulated sequence may be subjected to a CSD performer 3030 and be mapped on a beamforming matrix by a spatial mapper 3035.

A subchannel mapper 3040 may map the signal transmitted from the spatial mapper 3035 on a subchannel, and an IDFT performer 3045 may perform IDFT on the signal transmitted from the subchannel mapper 3040. A GI inserter 3050 may insert a GI into the signal transmitted from the IDFT performer 3045 and perform windowing on the signal. An RF communicator 3055 may transmit the signal transmitted from the GI inserter 3050 through an RF antenna. HEW-SIG-B may be transmitted via beamforming, and a reception apparatus is allowed to demodulate only a channel transmitted to the reception apparatus and thus may need to recognize the channel transmitted to the reception apparatus through HEW-SIG-A.

Figure 31:
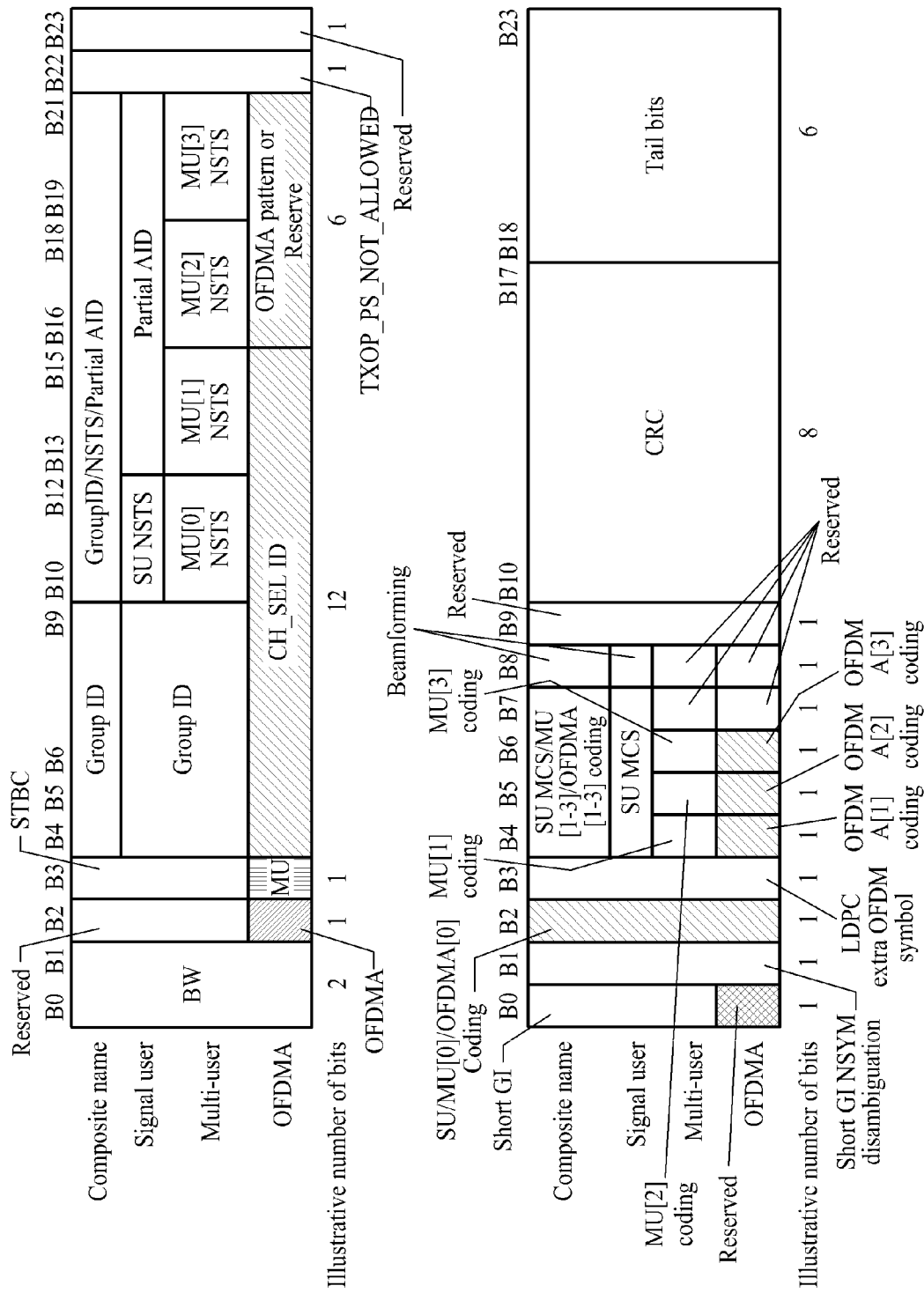
FIG. 31 is a diagram illustrating an example of an HEW-SIG-A structure according to the fourth embodiment.

FIG. 31 is a diagram illustrating an example of an HEW-SIG-A structure according to the fourth embodiment, which is an example of an HEW-SIG-A bit structure in a case where OFDMA and MU-MIMO (including beamforming) are combined. As in the relationships between FIGS. 16 and 17, bits and positions of composite names in FIG. 31 may be modified variously.

To indicate that transmission is performed by a combination of OFDMA and MU-MIMO, HEW-SIG-A may include bits indicating an OFDMA (B2 in FIG. 31) and bits indicating a MU (B3 in FIG. 31). A reception apparatus operating by MU-MIMO or beamforming is unable to demodulate a channel other than a channel selected for the reception apparatus and thus may need to recognize the channel selected for the reception apparatus. CH_SEL_ID may include information on a channel which each reception apparatus needs to demodulate. An OFDMA pattern indicates a pattern of a change in a case where allocation changes by channels not adjacent or symbol as in FIG. 23.

Figure 32:
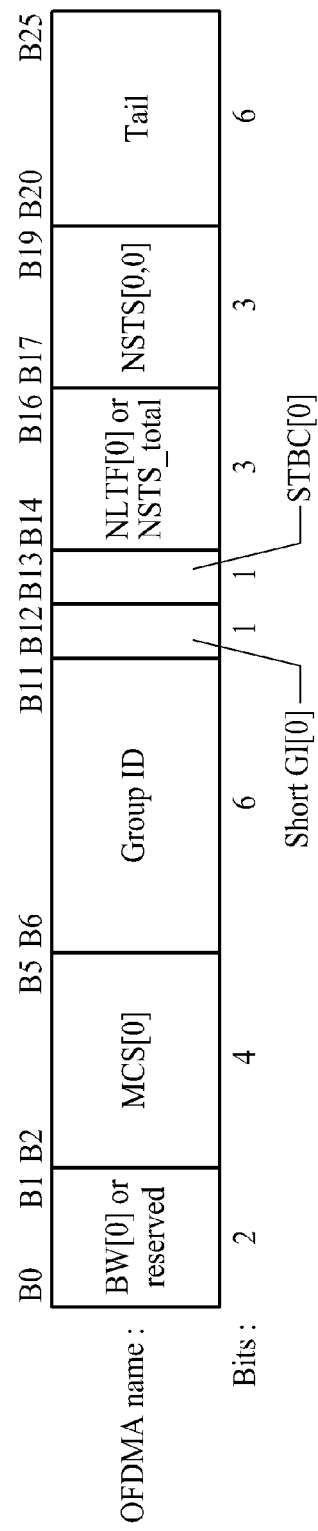
FIG. 32 is a diagram illustrating an example of an HEW-SIG-B structure according to the fourth embodiment.

FIG. 32 is a diagram illustrating an example of an HEW-SIG-B structure according to the fourth embodiment, which is an example of an HEW-SIG-B structure when a channel indicated in CH_SEL_ID has a bandwidth of 20 MHz. When the selected channel has bandwidths of 40 MHz and 80 MHz, the bandwidths may be easily extended by repeatedly transmitting 20 MHz as in FIG. 32.

Figure 33:
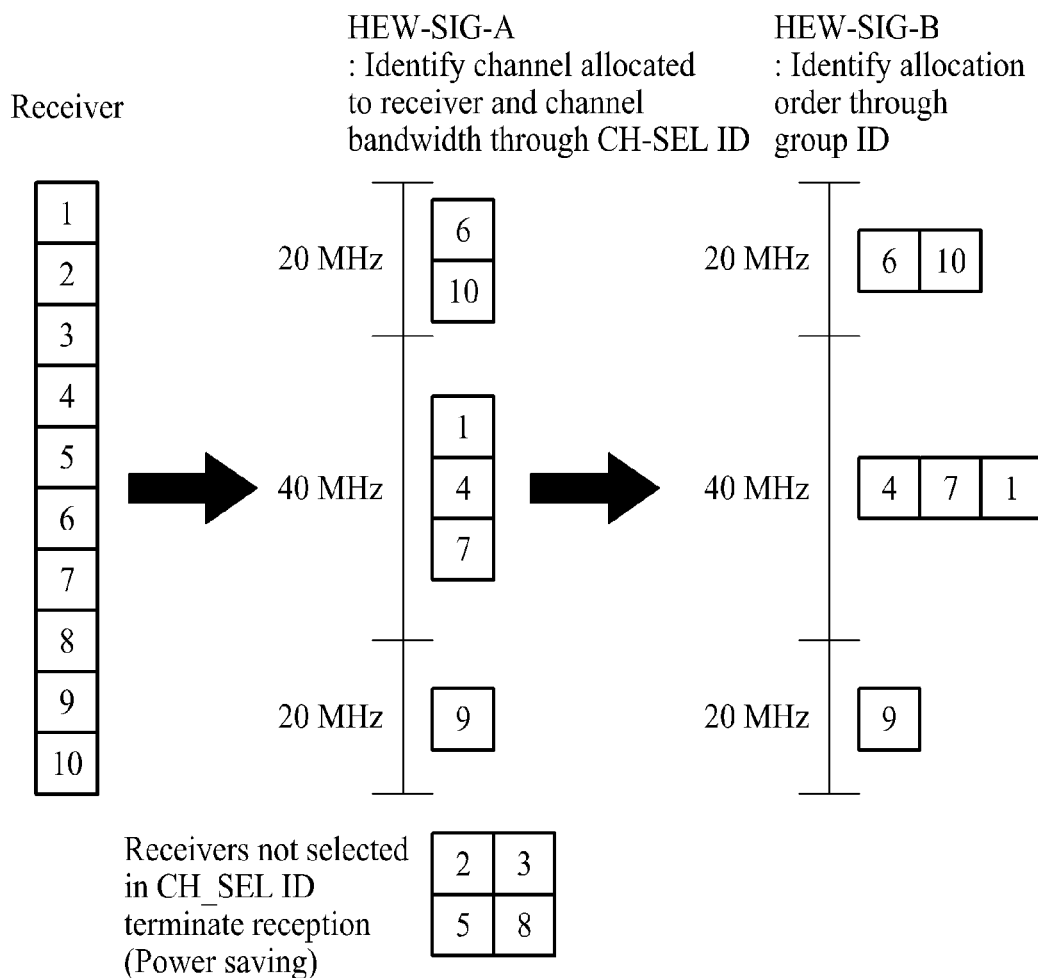
FIG. 33 is a diagram illustrating a reception mode according to the fourth embodiment.

FIG. 33 is a diagram illustrating a reception mode according to the fourth embodiment. In FIG. 33, it is assumed that a channel is configured by 20 MHz. Referring to FIG. 33, a transmission apparatus conducts transmission to reception apparatuses connected to the transmission apparatus by sequentially allocating higher transmission bands, that is, allocating a 20-MHz channel to {6, 10}, a 40-MHz band to {1, 4, 7}, and 20 MHz to {9}.

A reception apparatus may identify a channel allocated to the reception apparatus through CH_SEL_ID of HEW-SIG-A. When subchannels not adjacent are used, the reception apparatus may identify a combination of subchannels allocated to a channel using an OFDMA pattern. When a CH_SEL_ID value is a value to which the reception apparatus does not belong, which means that there is no allocated channel in a current PPDU, the reception apparatus terminates reception to save power consumption.

When a channel allocated to the reception apparatus is 40 MHz at a middle position, the reception apparatus may perform demodulation through an HEW-STF of the channel and estimate a channel through an HEW-LTF to demodulate HEW-SIG-B. The reception apparatus may identify a subsequent preamble structure after NLTF or NSTS_total based on a demodulation result and perform demodulation based on NSTS information.

Fifth Embodiment

Figure 34:
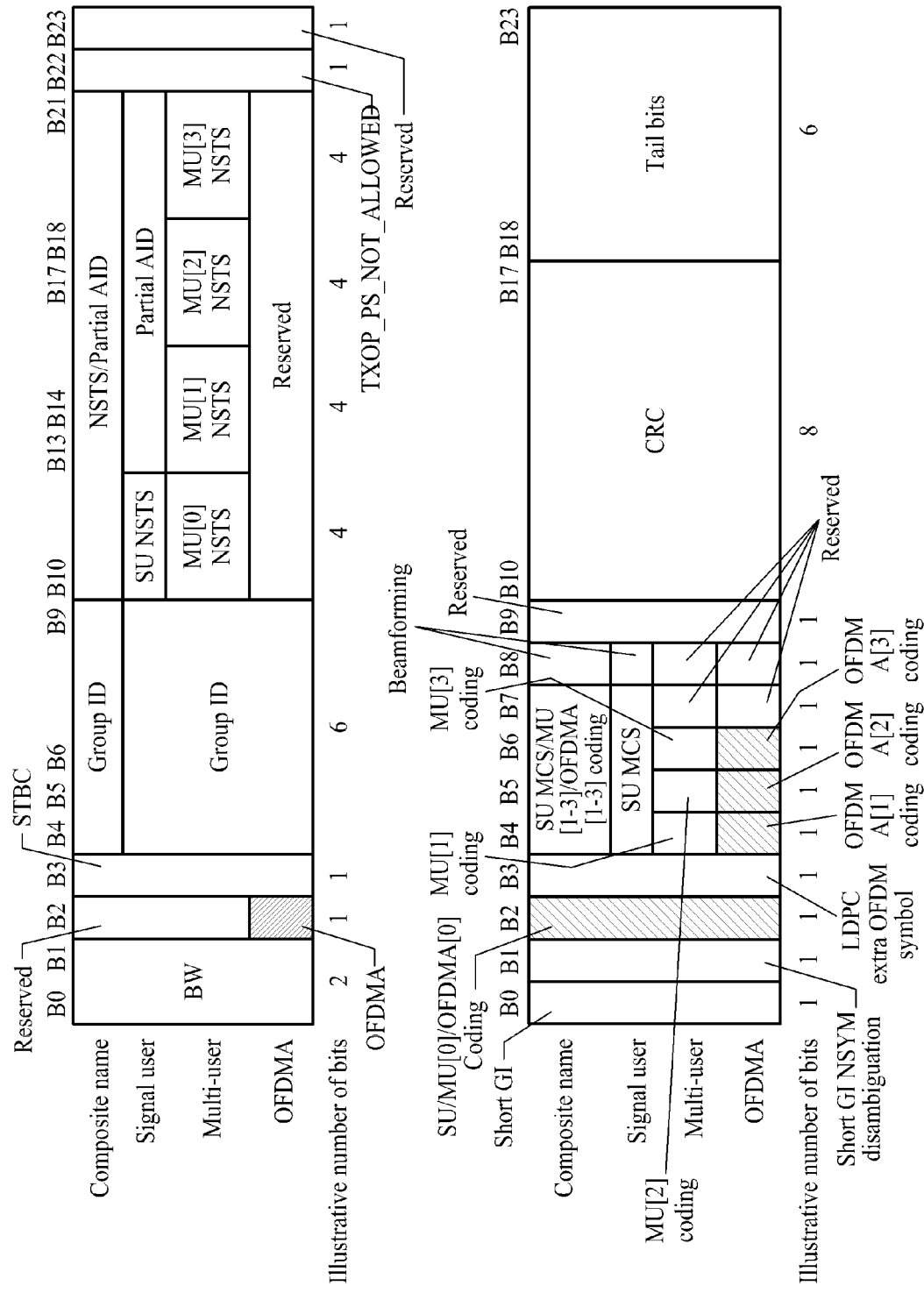
FIG. 34 is a diagram illustrating an example of an HEW-SIG-A structure according to a fifth embodiment.

FIG. 34 is a diagram illustrating an example of an HEW-SIG-A structure according to a fifth embodiment, which is an example of an HEW-SIG-A structure in a case where HEW-SIG-B indicates an NSTS. As in the relationships between FIGS. 16 and 17, bits and positions of composite names in FIG. 24 may be modified variously.

Figure 35:
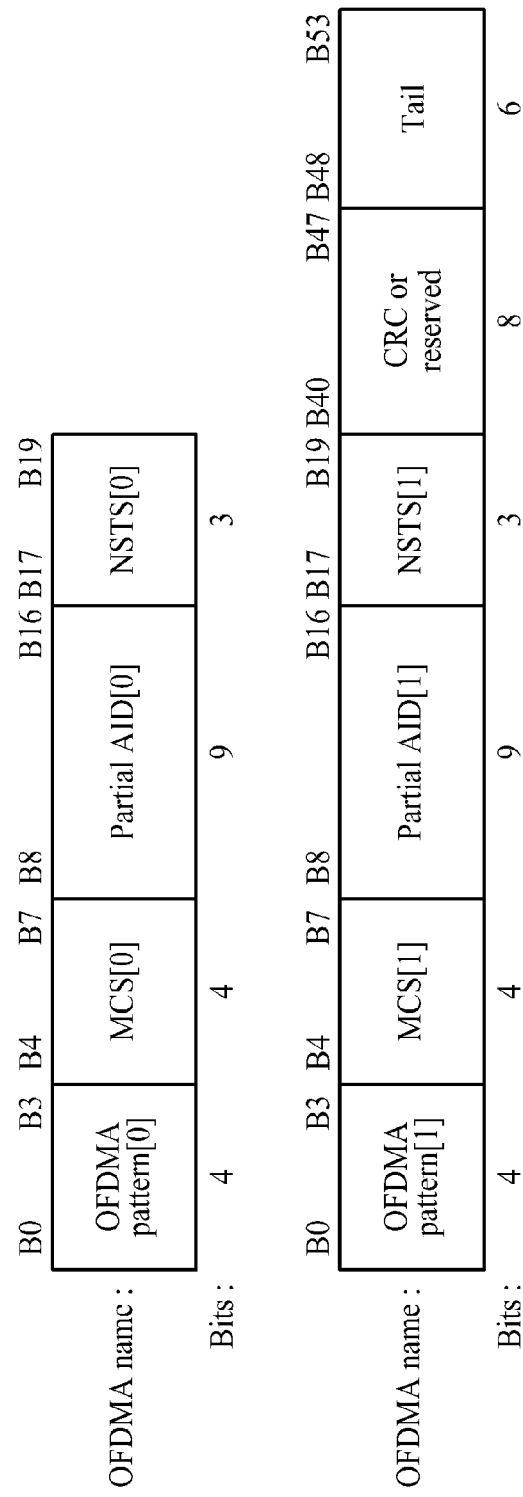
FIG. 35 is a diagram illustrating an example of an HEW-SIG-B structure according to the fifth embodiment.

FIG. 35 is a diagram illustrating an example of an HEW-SIG-B structure according to the fifth embodiment, which is an example of an HEW-SIG-B structure in a 40-MHz bandwidth. The HEW-SIG-B structure illustrated in FIG. 35 may be extended for a bandwidth of 80 MHz or greater as in the relationships between FIGS. 18 and 19. The structure may be easily extended from the embodiment of FIG. 35 by adjusting reserved bits and bits for an OFDMA pattern of FIGS. 20 and 22 even when the OFDMA pattern is used instead of a HEW-SIG-B BW for each channel.

Figure 36:
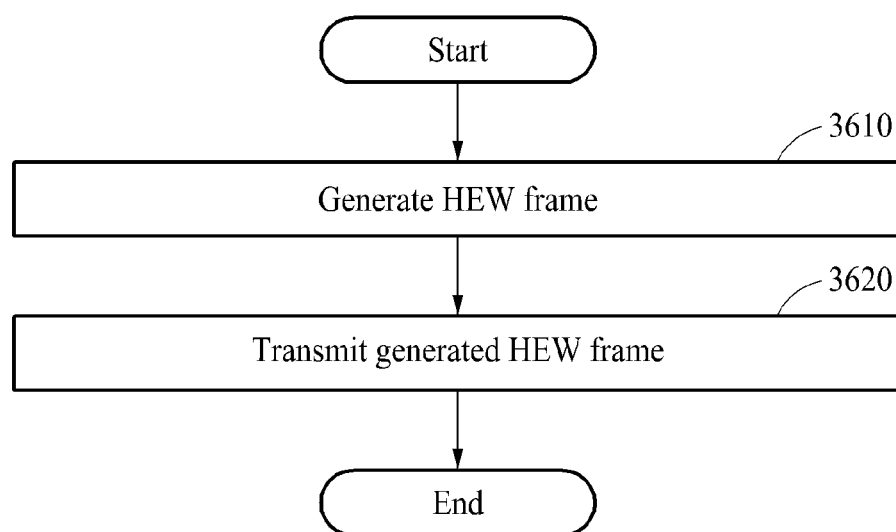
FIG. 36 is a flowchart illustrating operations of a wireless communication method according to an embodiment.

FIG. 36 is a flowchart illustrating operations of a wireless communication method according to an embodiment. The wireless communication method may be performed by a wireless communication apparatus including at least one processor. Referring to FIG. 36, the wireless communication apparatus may generate an HEW frame including at least one of an HEW-SIG-A field and an HEW-SIG-B field which include channel information for communication according to an OFDMA mode in operation 3610.

According to one embodiment, the HEW-SIG-A field may include at least one of bit information indicating an OFDMA mode, bit information indicating a number of space-time streams (NSTS) of channels transmitted in the OFDMA mode, and bit information indicating a coding mode of channels transmitted in the OFDMA mode.

According to another embodiment, the HEW-SIG-A field may include at least one of bit information indicating an OFDMA mode, bit information indicating an MU-MIMO mode, and bit information indicating a channel to be demodulated by each reception apparatus.

The HEW-SIG-B field may include at least one of bit information indicating a bandwidth used by each channel in the OFDMA mode, bit information indicating a modulation and coding mode used by each channel in the OFDMA mode, bit information indicating a partial AID used by each channel in the OFDMA mode, bit information including subchannel allocation information in the OFDMA mode, and bit information indicating a number of space-time streams (NSTS) of channels transmitted in the OFDMA mode. The bit information indicating the subchannel allocation information in the OFDMA mode may indicate channel allocation information in a bitmap format in a 20-MHz frequency bandwidth unit. According to one embodiment, the subchannel allocation information in the OFDMA mode may include allocation information on subchannels not adjacent or information on a subchannel allocated in a frequency bandwidth unit greater than 0 and smaller than 20 MHz.

The wireless communication apparatus may transmit the generated HEW frame to at least one reception apparatus in operation 3620. According to one embodiment, the wireless communication apparatus may transmit the HEW-SIG-B field using a frequency bandwidth indicated in the HEW-SIG-A field.

Figure 37:
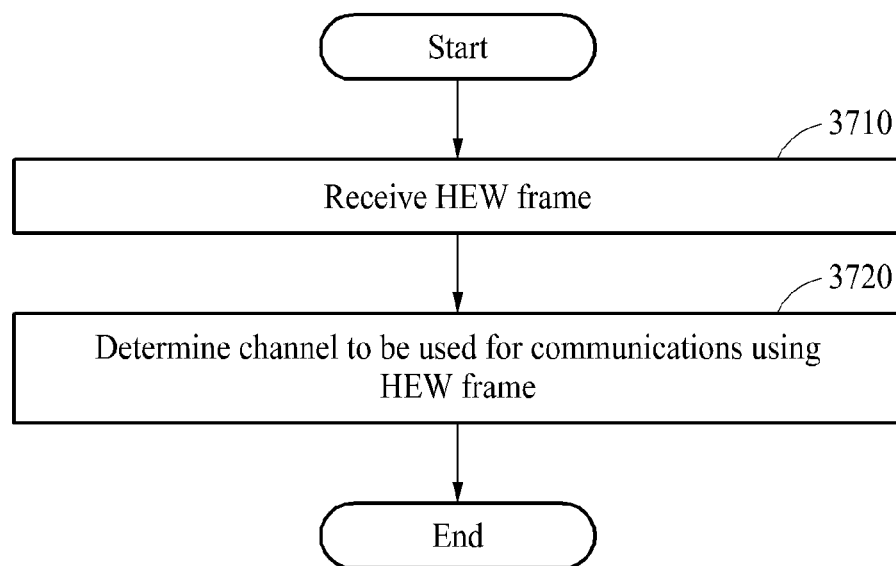
FIG. 37 is a flowchart illustrating operations of a wireless communication method according to another embodiment.

FIG. 37 is a flowchart illustrating operations of a wireless communication method according to another embodiment. The wireless communication method may be performed by a wireless communication apparatus including at least one processor. Referring to FIG. 37, the wireless communication apparatus may receive, from a transmission apparatus, an HEW frame including at least one of an HEW-SIG-A field and an HEW-SIG-B field which include channel information for communication according to an OFDMA mode in operation 3710.

The wireless communication apparatus may determine a channel to be used for communications using the channel information included in at least one of the HEW-SIG-A field and the HEW-SIG-B field included in the received HEW frame in operation 3720. According to one embodiment, the wireless communication apparatus may determine, based on the channel information included in the HEW-SIG-A field, a channel through which the HEW-SIG-B field is transmitted. The wireless communication apparatus may demodulate the HEW-SIG-B field based on an HEW-LTF included in the HEW-SIG-A field.

In the present invention, data is simultaneously transmitted to a plurality of stations using a 20-MHz unit or lower unit, thereby increasing frequency utilization efficiency.

The methods according to the embodiments may be realized as program instructions implemented by various computers and be recorded in non-transitory computer-readable media. The media may also include, alone or in combination with the program instructions, data files, data structures, and the like. The program instructions recorded in the media may be designed and configured specially for the embodiments or be known and available to those skilled in computer software. Examples of the non-transitory computer readable recording medium may include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine codes, such as produced by a compiler, and higher level language codes that may be executed by the computer using an interpreter. The described hardware devices may be configured to act as one or more software modules in order to perform the operations of the above-described exemplary embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits are combined or coupled in different forms and modes than as described above or be substituted or switched with other components or equivalents.

Thus, other implementations, alternative embodiments and equivalents to the claimed subject matter are construed as being within the appended claims.

The invention claimed is:

1. A wireless communication method performed by a wireless communication apparatus in a wireless local area network (WLAN) system, the wireless communication method comprising:
   generating a frame comprising an SIG-A field and an SIG-B field, wherein the SIG-B field comprises bit information that comprises subchannel allocation information in an Orthogonal Frequency-Division Multiple Access (OFDMA) mode where different subchannels are allocated to different users and simultaneous data transmission to multiple users is allowed; and
   transmitting the generated frame to the multiple users,
   wherein the bit information further indicates at least one of a partial allocation identifier (AID) used by each channel in the OFDMA mode, a modulation and coding mode used by each channel in the OFDMA mode and a number of space-time streams (NSTS) of channels transmitted in the OFDMA mode.

2. The wireless communication method of claim 1, wherein the subchannel allocation information indicates a position of each of subchannels in a channel bandwidth of 20 MHz, 40 MHz, 80 MHz, 80 MHz+80 MHz, or 160 MHz in the OFDMA mode, and
   wherein a frequency bandwidth of each of the subchannels is greater than 0 and smaller than 20 MHz.

3. The wireless communication method of claim 1, wherein each of the subchannels represents a minimum allocation unit, and
   wherein the frequency bandwidth of each of the subchannels is dynamically set from 0 to 20 MHz.

4. The wireless communication method of claim 1, wherein the transmitting of the frame transmits the SIG-B field using a frequency bandwidth indicated in the SIG-A field.

5. A wireless communication method performed by a wireless communication apparatus in a wireless local area network (WLAN) system, the wireless communication method comprising:
   receiving, by the wireless communication apparatus corresponding to one of multiple users from a transmission apparatus, a frame comprising an SIG-A field and an SIG-B field, wherein the SIG-B field comprises bit information that comprises subchannel allocation information in an Orthogonal Frequency-Division Multiple Access (OFDMA) mode where different subchannels are allocated to different users and simultaneous data transmission to the multiple users is allowed; and
   determining each of subchannels to be used for communications based on at least the subchannel allocation information,
   wherein the bit information further indicates at least one of a partial allocation identifier (AID) used by each channel in the OFDMA mode, a modulation and coding mode used by each channel in the OFDMA mode and a number of space-time streams (NSTS) of channels transmitted in the OFDMA mode.

6. The wireless communication method of claim 5, wherein the subchannel allocation information indicates a position of each of subchannels in a channel bandwidth of 20 MHz, 40 MHz, 80 MHz, 80 MHz+80 MHz, or 160 MHz in the OFDMA mode, and
   wherein a frequency bandwidth of each of the subchannels is greater than 0 and smaller than 20 MHz.

7. The wireless communication method of claim 5, wherein each of the subchannels represents a minimum allocation unit, and
   wherein the frequency bandwidth of each of the subchannels is dynamically set from 0 to 20 MHz.

8. The wireless communication method of claim 5, wherein the wireless communication apparatus determines, based on channel information comprised in the SIG-A field, a channel through which the SIG-B field is transmitted.

9. The wireless communication method of claim 5, wherein the wireless communication apparatus demodulates the SIG-B field based on an LTF comprised in the SIG-A field.

10. A wireless communication apparatus comprising:
    a processor to generate a frame comprising an SIG-A field and an SIG-B field, wherein the SIG-B field comprises bit information comprising subchannel allocation information in an Orthogonal Frequency-Division Multiple Access (OFDMA) mode where different subchannels are allocated to different users and simultaneous data transmission to multiple users is allowed; and
    a transmitter to transmit the generated frame to the multiple users,
    wherein the bit information further indicates at least one of a partial allocation identifier (AID) used by each channel in the OFDMA mode, a modulation and coding mode used by each channel in the OFDMA mode and a number of space-time streams (NSTS) of channels transmitted in the OFDMA mode.

* * * * *